United States Patent [19]

Imoto et al.

[11] 4,101,300
[45] Jul. 18, 1978

[54] METHOD AND APPARATUS FOR DRAWING OPTICAL FIBER

[75] Inventors: Katsuyuki Imoto, Sayama; Gyozo Toda, Hino; Masao Sumi, Higashiyamato, all of Japan

[73] Assignees: Hitachi, Ltd.; Hitachi Cable, Ltd., both of Japan

[21] Appl. No.: 744,454

[22] Filed: Nov. 23, 1976

[30] Foreign Application Priority Data

Nov. 27, 1975 [JP] Japan .............................. 50-142055
Dec. 22, 1975 [JP] Japan .............................. 50-151825
Mar. 22, 1976 [JP] Japan .............................. 51-29960

[51] Int. Cl.² .............................................. C03B 37/02
[52] U.S. Cl. .............................. 65/2; 65/11 W; 65/12; 65/13; 65/29; 65/DIG. 7; 356/73
[58] Field of Search ................. 65/13, 32, DIG. 7, 29, 65/12, 2, 11 W; 356/73

[56] References Cited

U.S. PATENT DOCUMENTS

| | | | |
|---|---|---|---|
| 3,540,870 | 11/1970 | Li | 65/32 X |
| 3,679,384 | 7/1972 | Colson et al. | 65/32 X |
| 3,837,824 | 9/1974 | Siegmund | 65/32 X |
| 3,879,128 | 4/1975 | Presby | 65/29 X |
| 3,890,127 | 6/1975 | Siegmund | 65/13 X |

Primary Examiner—Robert L. Lindsay, Jr.
Attorney, Agent, or Firm—Craig & Antonelli

[57] ABSTRACT

For drawing an optical fiber from an optical fiber preform there are provided means for heating an optical fiber preform, means for pulling out an optical fiber from the optical fiber preform whose fore end part has been fused by heating, and means for causing gas to flow along the outer peripheral surface of the fused part of the optical fiber preform. By further controlling the flow rate of the gas and/or the pulling-out velocity for the optical fiber according to fluctuations in the fiber diameter of the optical fiber, an optical fiber of uniform fiber diameter is easily provided.

30 Claims, 41 Drawing Figures

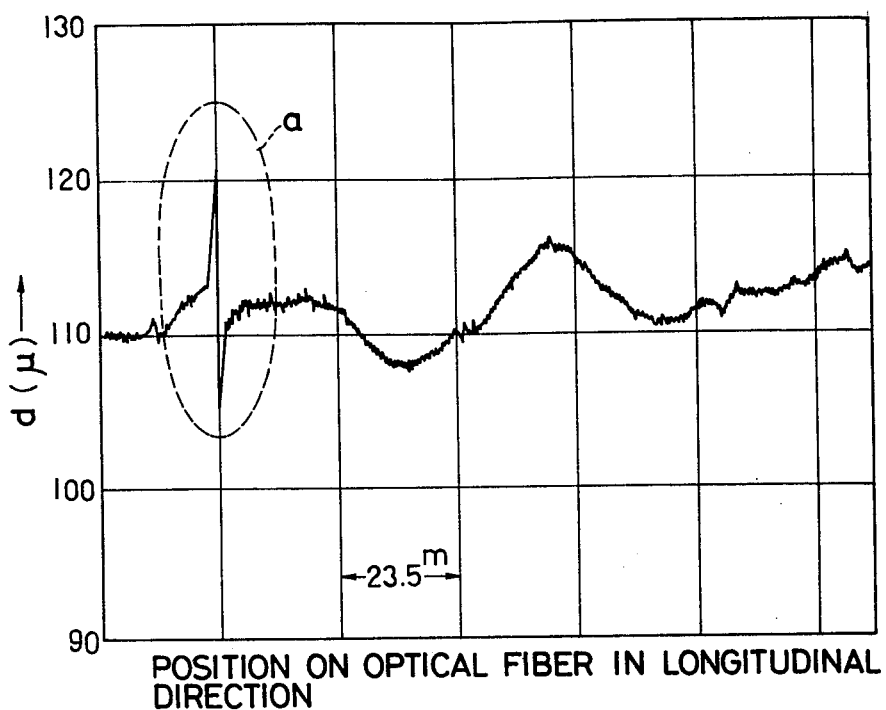
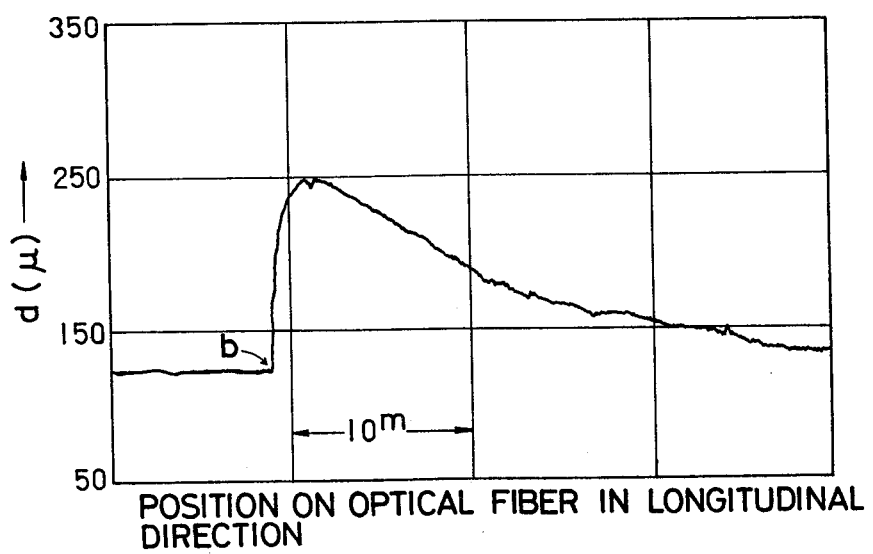

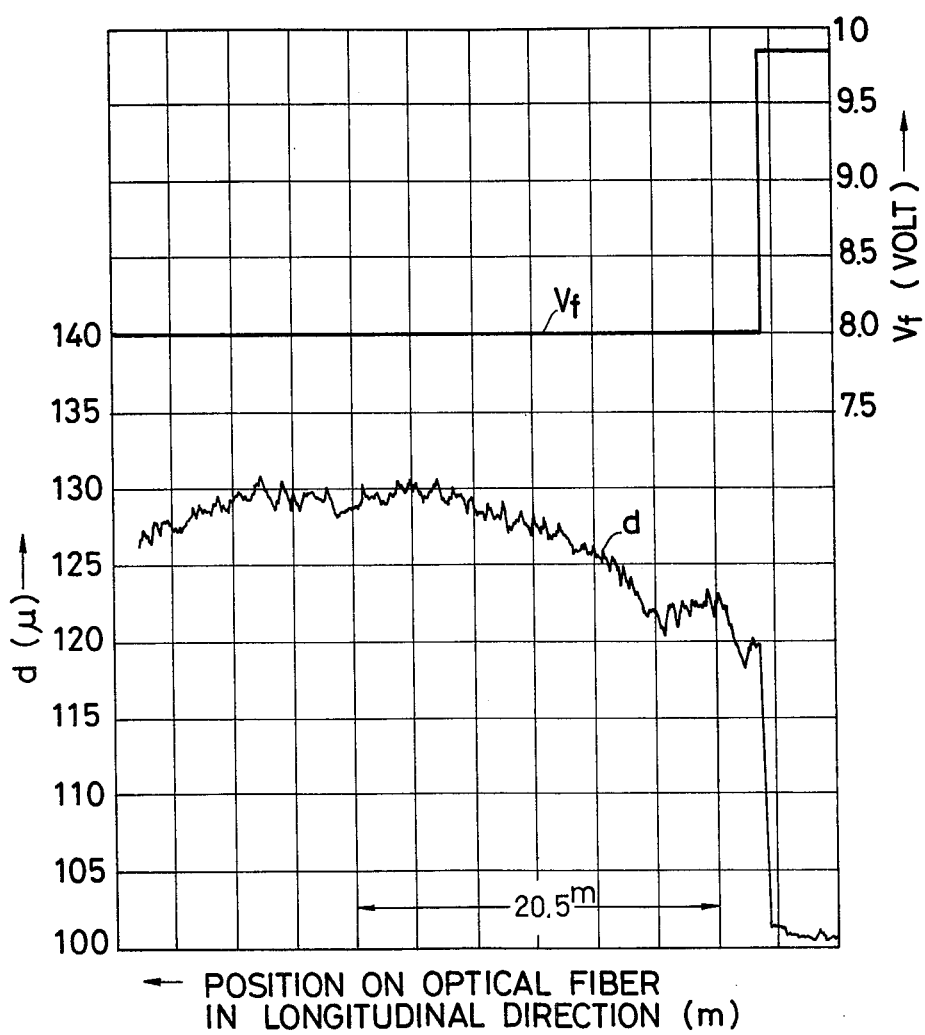

POSITION ON OPTICAL FIBER IN LONGITUDINAL DIRECTION (m)

METHOD AND APPARATUS FOR DRAWING OPTICAL FIBER

BACKGROUND OF THE INVENTION

1. Field of the Invention

The invention relates to a drawing technique wherein an optical fiber preform (hereinbelow, simply written "preform") is heated by heating means and one end of the preform in the fused state is drawn and finished to form an optical fiber. More particularly, it relates to a drawing apparatus for producing an optical fiber of predetermined uniform fiber diameter.

2. Brief Description of the Prior Art

Research of optical fibers has rapidly progressed for several years, and the technology has reached the stage at which disclosures of successful trial manufactures of optical fibers exhibiting very low transmission losses of several dB/km have been published one after another. At the present time there exists the prospect of a low transmission loss, and, as a result, a broad band optical transmission line, easy connection between the optical fibers, etc., have been sought. One of the important keys to a broad band, loss due to the connection, etc., is uniformity of the diameter of the optical fiber. The uniformity of the diameter of the optical fiber depends on an apparatus for drawing the optical fiber.

Heretofore, the drawing of the very low loss optical fiber has been carried out with an apparatus as shown in FIG. 1. A preform 1 having an outside diameter D is inserted at a constant speed $v_p$ into a furnace tube 3 heated by a heating source 2. One end of the preform heated and fused is pulled out, and wound around a drum 6. Subsequently, while under control of a motor controller 8, a motor (not shown) is driven to rotate the drum 6. As optical fiber 9 is drawn at a constant speed $v_f$, it is taken up so as to attain an outside diameter of predetermined value $d$.

In this case, the diameter of the optical fiber 9 is detected by a detector 4 and is indicated on a fiber diameter measuring instrument 5. Where a fluctuation has arisen in the diameter of the optical fiber 9, fiber diameter control is conducted in such a way that an anlog output of the fiber diameter measuring instrument 5 is delivered to a control circuit 7. This is compared with a reference voltage corresponding to the predetermined fiber diameter, and the resultant output signal of the control circuit 7 is fed back to the motor controller 8, so that the take-up speed $v_f$ of the drum 6 is changed.

The inventors have studied the prior-art method from various points, and have investigated the mechanism of the fluctuation of fiber diameter. As the result, it has been revealed that factors for the fluctuation of the fiber diameter may be broadly classified into the following two:

(1) Fluctuations in the preform fusing temperature attributed to variations in air current A which flows upwards through the interior of the furnace tube 3 (i.e., attributed to disturbance).

(2) Variations in the outside diameter of the preform.

In particular, the fluctuation of the fiber diameter due to the factor (1) occurs frequently during the drawing. The fiber diameter fluctuations ascribable to the factor (1) amount to ± several % to ± several tens %. Moreover, the time constant at the fiber diameter fluctuation is on the order of a second. Therefore, even when the fiber diameter is controlled by changing the tape-up speed of the drum, it is difficult to suppress the fiber diameter fluctuation to below ± 2 to ± 3%.

Where the preform has outside diameter variations of about ± 3.5%, the fiber diameter fluctuations are about ± 7% even when the fiber diameter control is executed by prior art techniques.

SUMMARY OF THE INVENTION

A principal object of the invention is to provide an optical fiber drawing method and apparatus which eliminate the difficulty of the above-mentioned item (1) in the prior art.

A further object is to provide an optical fiber drawing method and apparatus which eliminate the difficulty of the above-mentioned item (2) simultaneously with the item (1) if necessary.

In order to accomplish these objects, the invention comprises (i) means for heating a preform, (ii) means for pulling out an optical fiber from the preform whose fore end part has been fused by heating, and (iii) means for causing a gas to flow along the outer peripheral surface of the fused part of the preform.

The invention comprises, in addition to the aforecited means and in order to control the fiber diameter, means for regulating the flow rate of the gas and/or the pulling-out speed for the optical fiber in response to fluctuations in the diameter of the optical fiber.

The means for heating the preform may be any of resistance heating, induction heating, heating by an oxyhydrogen burner, heating with a carbonic acid gas laser, etc. The heating means, however, must be capable of heating the preform to the fusion point thereof. By way of example, where the preform is made of a material of the quartz series, the heating means must be capable of heating the preform to 1,850°–2,200° C (usually about 1,950° C).

The means for pulling out the optical fiber is usually a drum capable of rotating at a predetermined speed. The drum can take up the optical fiber, and is usually rotated by a motor.

Description will now be made of the means for causing the gas to flow along the outer peripheral surface of the fused part of the preform (hereinbelow, called the gas curtain device). Desirably, the gas curtain device is made of a high heat resisting material such as quartz glass, high silica glass, ceramics and stainless steel. The gas curtain device comprises a ring-shaped pipe which has a plurality of apertures on the inner peripheral side thereof, and a gas conduit which introduces the gas into the ring-shaped pipe. The preform is inserted into the ring without touching it, and the ring-shaped pipe is located at an unfused part of the preform somewhat above the fused preform part. Further, another gas curtain device may be disposed below the fused preform part so that the optical fiber pulled out may be inserted thereinto on the axis of the preform. The inside ring diameter of the former ring-shaped pipe is larger than the outside diameter of the preform, so that the pipe does not come into contact with the preform in the state in which the preform is inserted in the ring. The latter ring-shaped pipe is also made so that it may not come into contact with the optical fiber. Ordinarily, it may be one similar to the former. Where resistance heating or heating with a burner is employed as the heating method, a furnace tube usually is provided so as to surround the outer sides of a part of the preform and a part of the optical fiber pulled out. When the furnace tube is disposed in this manner, the gas curtain device (or devices) may be provided above the furnace tube or above and below the furnace tube. The size of the apertures of the ring-shaped pipe may be any desired size as long as the gas is substantially uniformly blown against the outer peripheral surfaces of the preform and the optical fiber. Accordingly, the apertures on the inner peripheral side of the ring-shaped pipe may be replaced with slits.

Employed as the gas is an inert gas such as $N_2$ and Ar; an oxidizing gas such as $O_2$, $CO_2$ and air; or an oxidizing gas containing a reactive gas for forming a glass film (for example, $O_2$ containing $SiCl_4$). When a reactive gas is employed, a protective film is formed on the surface of the preform or the optical fiber simultaneously with the drawing or a dopant is further added, whereby the refractive index of the surface layer can be adjusted. In general, however, $N_2$, Ar, etc., are desirable from the viewpoint of preventing the transparency of the outer peripheral surface of the preform from lowering, rendering the life of the furnace tube long, etc.

The flow rate of the gas which is caused to flow along the outer peripheral surface of the fused preform part shall be at least an amount necessary for suppressing an air current which flows upwards along the outer surface. Usually, the flow rate of the ascending current is about 1 - 3 l/min at the maximum. A desirable flow rate of the gas is therefore at least 1 l/min, but an effect is noted even at a flow rate of about 0.5 l/min. The upper limit of the flow rate of the gas shall be the greatest flow rate at which the flowing gas does not become a turbulent flow. The flow rate at which the flowing gas becomes turbulent differs depending on the dimensions and shapes of the preform, the heating means etc. By way of example, it is about 350 l/min in case where the preform has a diameter of 8 mm and where the furnace tube of a heating furnace has a length of 260 mm and a diameter of 19 mm. Accordingly, when the preform and the heating means of such dimensions and shapes are employed, the flow rate of the gas may be set at 0.5 - 350 l/min. However, when the flow rate is larger than about 20 l/min, the effect shows the tendency of saturation, while heat is taken away by the flowing gas and the output of the heater need be raised. In general, therefore, a flow rate of the gas below about 20 l/min suffices. Since, as previously stated, the flow rate of the ascending current can reach 1 - 3 l/min, a desirable range of the gas flow rates is 1 - 20 l/min, and a more desirable range is 3 - 20 l/min.

Also where the two gas curtain devices are provided at the upper and lower positions, the total flow rate of the gas shall be at least the amount necessary for suppressing the air current (the air current blowing upwards) by the flows of the gas flowing out from the upper and lower gas curtain devices.

Usually, the gas flowing out from the gas curtain device flows in both the upward and downward directions. Accordingly, in case of the gas curtain device which is located at the unfused preform part, the gas which flows out downwards is effective as it passes around the fused preform part and suppresses the ascending current, whereas the gas which flows out upwards is not very effective although it has the effect of preventing the external air from mixing into the flow of the gas flowing out downwards. In case of the gas curtain device which is located below the preform, the gas which flows out downwards suppresses the ascending current, and the gas which flows out upwards passes around the fused preform part and stabilizes the temperature of this part. As an ordinary procedure of design, however, it is sufficient that the difference between the amount of the gas flowing out downwards from the upper gas curtain device and the amount of the gas flowing out upwards from the lower gas curtain device exceeds the flow rate of the ascending current, Of course, where only the upper gas curtain device is provided, it is sufficient that the amount of the gas flowing out downwards exceed the flow rate of the ascending current. When, from such viewpoints, the gas outflow ports on the inner peripheral side of the pipe ring are designed so that the gas may mainly flow out in one of the upward and downward directions, gas can be saved.

The means for regulating the optical fiber pulling-out speed according to the fluctuations of the fiber diameter in order to control the diameter of the optical fiber may be one which has been used in the optical fiber drawing apparatus of the prior art described previously. As the fiber diameter detector, an optical non-contact type detector is usually employed.

In the above-mentioned method for controlling the fiber diameter by changing the optical fiber pulling-out speed $v_{fi}$ however, a tension which is exerted on the optical fiber at the drawing changes with the speed $v_{fi}$ and hence, a dispersion is prone to occur in the mechanical strength of the optical fiber. In case of employing a heating source which has a broad temperature distribution width, the length of the heated and fused part of the preform becomes large, and hence, the time constant of the fiber diameter flucutation response to the stepped change of the take-up speed of the drum is large.

Accordingly, in such case where many fluctuations of the outside diameter exist in the preform in a short period, the fluctuations of the tensile strength of the tension on the optical fiber often accumulate, so that the steady state error of the fiber diameter becomes large. It is therefore difficult to control the fiber diameter fluctuations with high precision. In order to eliminate this difficulty, the fiber diameter control may be carried out in such a way that the flow rate of the gas flowing along the outer peripheral surface of the fused preform part is varied according to the fluctuations of the optical fiber diameter.

To this end, the diameter of the optical fiber is detected by the fiber diameter detector, the detected value is indicated as a voltage or current value by the fiber diameter measuring instrument, the output signal of the measuring instrument is applied to the control circuit so as to compare it with a reference voltage corresponding to a predetermined fiber diameter, an output signal of the control circuit as obtained by the comparison is applied to a valve opening-and-shutting unit belonging to the gas curtain device so as to actuate the unit, and the flow rate of the gas is changed according to the diameter of the optical fiber so as to keep it constant. The fiber diameter detector may be the same as has been employed for regulating the optical fiber pulling-out speed in the prior art, and it may be, for example, a laser fiber diameter measuring machine manufactured by Anritsu Electric Co., Ltd. (Tokyo, Japan). The detector of this fiber diameter measuring machine is of the non-contact type. Where the flow rate of the gas is comparatively small, the gas flow rate is decreased when the fiber diameter has become too small (the fiber has become too fine), and it is increased when the fiber diameter has become too large (the fiber has become too thick). Where the gas flow rate is comparatively large, it is changed conversely to the above.

Usually, the former case holds when the gas flow rate is below 6 l/min, and the latter case holds when it is above 9 l/min. Since, however, these values are somewhat different depending on the preform diameter, the heating temperature, the furnace length, the furnace diameter, etc., it is desirable to experimentally confirm the values under the respective conditions. Between both the gas flow rates (herein, between 6 l/min and 9 l/min), there exits a range in which the optical fiber diameter is not considerably influenced even by changing the gas flow rate. This flow rate range must be avoided in the case of controlling the optical fiber diameter by the change of the gas flow rate.

The control circuit which compares the voltage value or current value corresponding to the diameter of the optical fiber with the reference value corresponding to the predetermined fiber diameter and which, when both the values differ, provides the output signal corresponding to the difference may be any well-known circuit having been employed for the comparison of such voltages or currents.

With such a method for obtaining the optical fiber of uniform diameter by the control of the gas flow rate, when the outside diameter of the preform fluctuates by, for example, ± 3.5% or so, the gas flow rate must be changed by ± 400 l/hr or so. The gas flow rate at the beginning must be set by further adding to the amount 400 l/hr a gas flow rate sufficient to suppress the fiber diameter fluctuation due to the disturbance. Otherwise, when the gas flow rate is changed by, for example, −400 l/hr, no gas flows around the fused preform part, and fiber diameter control becomes impossible. It is difficult, however, to control such a large flow rate of the gas at high precision. Therefore, the gas at a fixed flow rate and the gas for regulation may be caused to flow along the outer peripheral surface of the fused preform part through individual paths independent of each other. By way of example, the gas at the fixed flow rate (for example, 550 l/hr) enters into a gas mixer from one gas conduit, the gas for regulation enters into the gas mixer from another gas conduit (to which the valve opening-and-shutting unit belongs), both the gases are mixed, and the mixture is supplied to the gas curtain device. With such a construction, the flow rate of gas stream to be controlled becomes comparatively small, and the difficulty described above is eliminated.

When the optical fiber drawing apparatus equipped with the gas curtain device or devices having the various mechanisms for controlling the gas flow rate is further provided with the prior-art mechanism for controlling the optical fiber pulling-out speed, the diameter of the optical fiber can be easily controlled so as to be uniform even in case of employing the preform which has very large fluctuations in the outside diameter (for example, which is tapered).

BRIEF DESCRIPTION OF THE DRAWINGS

FIGS. 3, 5 and 6 are diagrams showing the situations of diameter fluctuations of optical fibers manufactured by the prior-art apparatus.

FIG. 14c is a diagram showing a characteristic of the response of optical fiber diameter fluctuation to a change of the fiber take-up speed in the embodiment of the drawing apparatus according to the invention;

DETAILED DESCRIPTION

Figure 1:
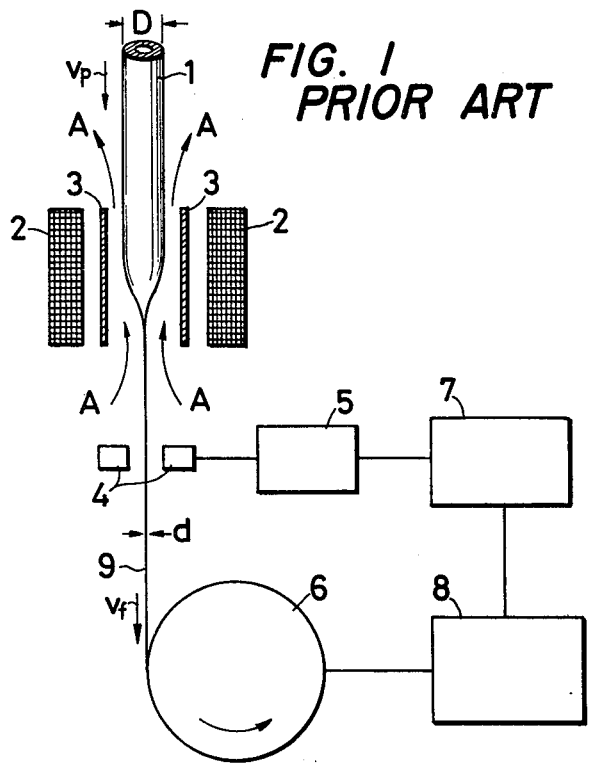
FIG. 1 is an explanatory view showing the construction of a prior-art optical fiber drawing apparatus.
Figure 3:
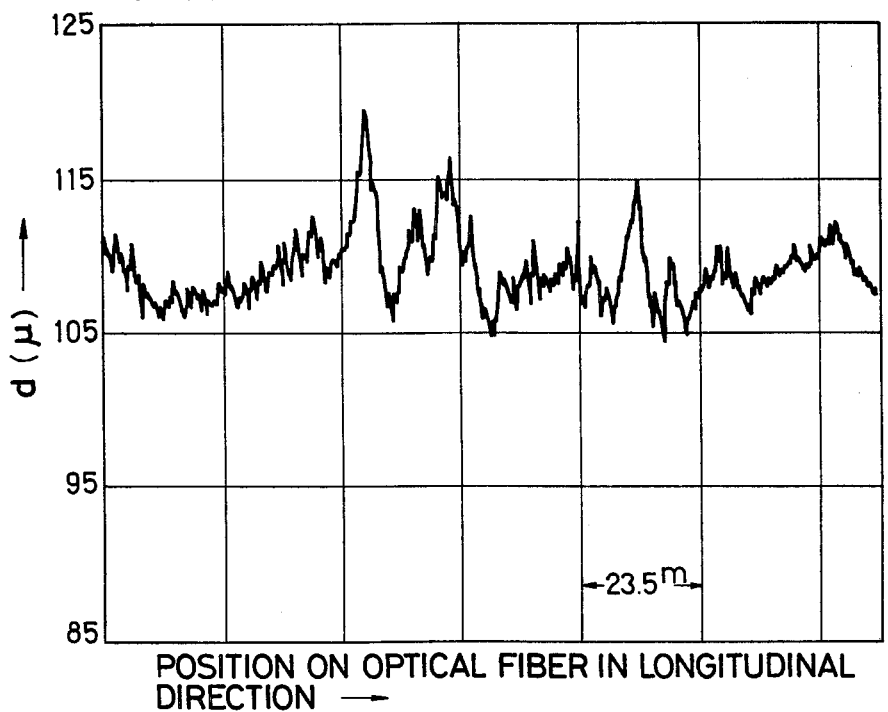
Figure 2:
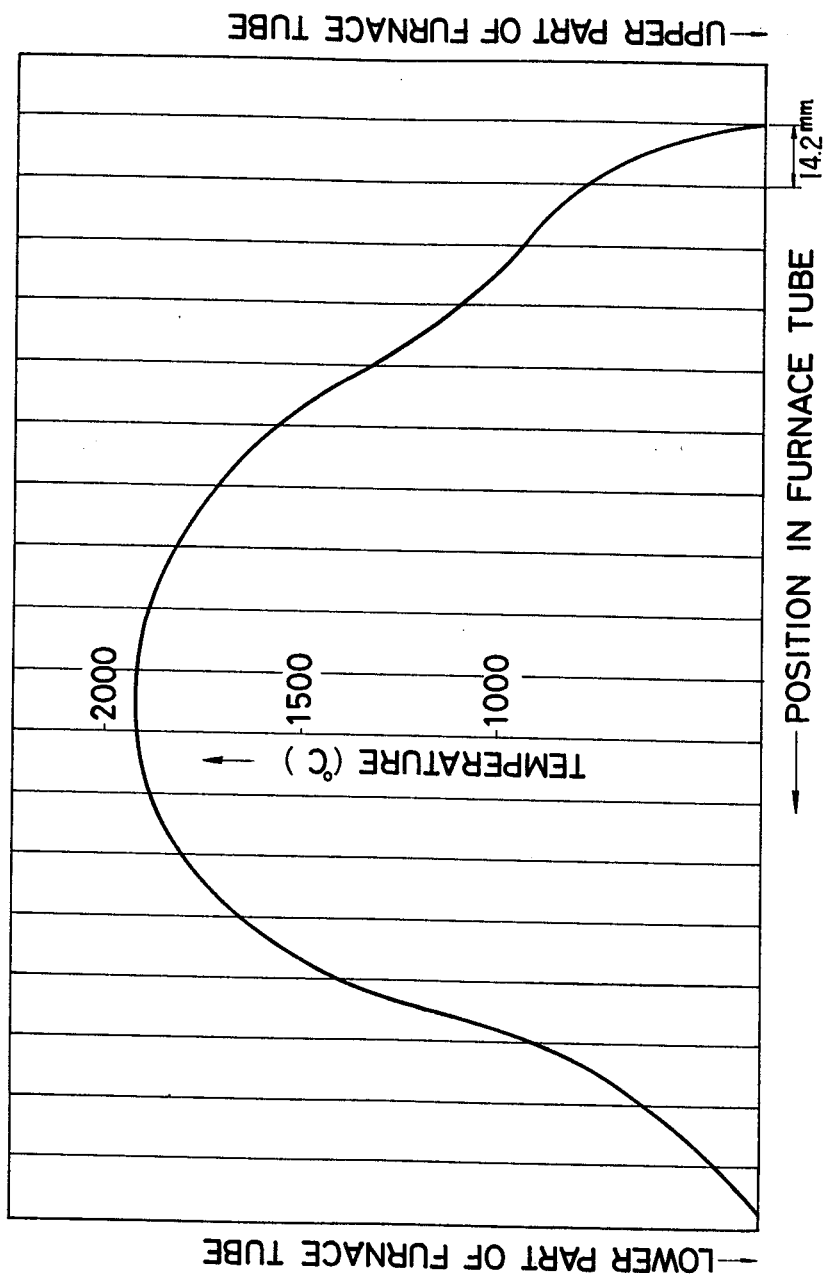
FIGS. 2 and 4 are diagrams of temperature distributions in a furnace tube in the prior-art optical fiber drawing apparatus.

FIG. 2 shows a temperature distribution in the lengthwise direction of the furnace tube 3 in the case where the furnace tube having an inside diameter of 19 mm and a length of about 270 mm was heated by the heating source 2 in the prior-art optical fiber drawing apparatus illustrated in FIG. 1. In FIG. 2, the abscissa represents position to the furnace tube, and the ordinate represents temperature. The preform 1 (quartz glass having an outside diameter of 8 mm was inserted into the furnace tube 3 at a moving speed of $v_p = 7.1$ mm/min, and the optical fiber 9 was taken up on the drum 6 at a take-up speed of $v_f= 38$ m/min. As a result, a fiber diameter characteristic of the optical fiber as illustrated in FIG. 3 was obtained. Fiber diameter fluctuations in this case were ± 7.1%. In any of the characteristic diagrams of FIG. 3, referred to above, and FIGS. 5 and 6, to be explained below, which illustrate changes in the fiber diameter $d$ of the optical fiber, the optical fiber was moved rightwards. In each of these diagrams, the abscissa represents positions on the optical fiber, and the ordinate represents diameter $d$ of the fiber.

However, where the stream of air around the apparatus fluctuated even slightly by such a cause that an operator worked in the vicinity of the apparatus during the drawing and that a person passed near the apparatus fiber diameter fluctuations greater than ± 10% occurred. Moreover, the fiber diameter response in this case was nearly stepped. Therefore, control could not be satisfactorily conducted, and it was impossible to make the fiber diameter fluctuations smaller than ± 5%.

Figure 4:
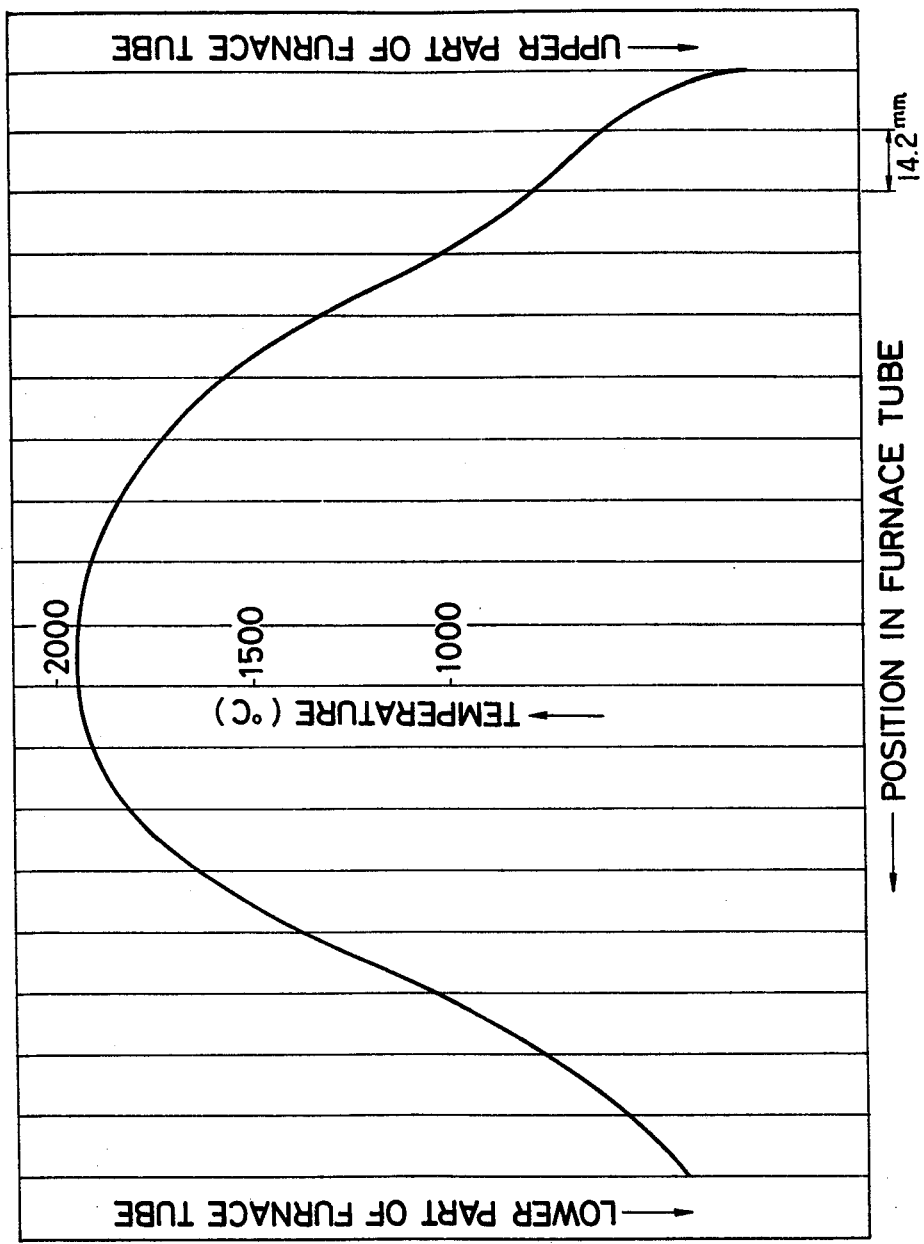

In order to reduce changes in the air current in the furnace tube 3 as are as possible, the upper part of the furnace tube 3 was closed with a cover made of brick which had an inside diameter (8.5 mm) substantially equal to the outside diameter of the preform. A temperature distribution in the longitudinal direction of the furnace tube 3 in that case is shown in FIG. 4, in which the abscissa an the ordinate are the same as in FIG. 2. When the fiber diameter characteristic of the optical fiber was measured by the same method as in FIG. 3, the characteristic of FIG. 5 was obtained. In this case, the fiber diameter fluctuations in the steady state were ± 5.5% and they were smaller than in the case of FIG. 3 providing no cover.

As indicated at $a$ in FIG. 5, however, the preform came into contact with the cover and vibrated slightly, so that a fiber diameter fluctuation due to an air current change arose. Thus, it has been revealed that, even when the furnace tube is provided with the upper cover so as to reduce the change of the air current, disadvantageously a spike-like sudden fluctuation is prone to occur in the fiber diameter, the control of the fiber diameter being difficult as in the case of FIG. 3.

FIG. 6 shows an example of the results of experiments which were performed in order to analyze the response of the fiber diameter fluctuation to the change of the air current. That is, it shows the fiber diameter fluctuation response characteristic in the case where the cover made of brick came off at a point $b$ during the drawing of the optical fiber. As is apparent from the figure, the fiber diameter fluctuated as much as about 110% suddenly at the moment of the opening of the cover, and it took about 2 minutes before the fiber diameter returned to a steady value.

In this manner, it oftens occurs in the prior-art drawing apparatus that, due to the change of the air current in the furnace tube 3, the fusion temperature of the fore end part of the preform fluctuates and the fiber diameter fluctuates in the step shape, and fiber diameter control below ± several % is difficult.

As set forth above, it has been revealed that, in the optical fiber drawing apparatus of the prior art, the fluctuation of the fusion temperature is prone to arise due to the air current change in the furnace tube, especially around the fore end part of the optical fiber preform. Moreover, the temperature fluctuation causes the diameter of the optical fiber to fluctuate sharply, and once fiber diameter fluctuation has arisen, a time of several minutes is required before the original fiber diameter value is restored. There is also the disadvantage that fiber diameter control is difficult as to the sudden change of the air current.

The invention has for a first object the elimination of the disadvantages of the prior art as described above. To this end, the gas curtain device described above is arranged, thereby suppressing the change of the air current around the fore end part of the optical fiber preform so as to reduce the fiber diameter fluctuations and to facilitate the fiber diameter control against load fluctuations (for example, outside diameter fluctuations of the preform).

While the heating means employing the furnace tube will be referred to below, the invention is also applicable to a drawing apparatus which adopts other heating means, for example, direct heating means such as heating means employing laser light.

Figure 7A:
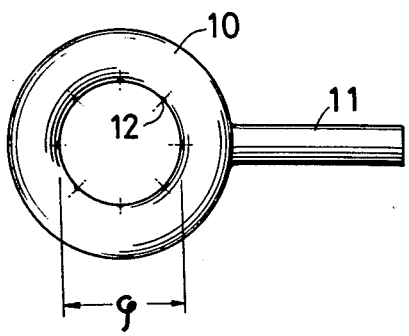
FIGS. 7a and 7b, FIGS. 8a and 8b, and FIGS. 9a, 9b and 9c are views showing embodiments of a gas curtain device of the invention, respectively.
Figure 7B:
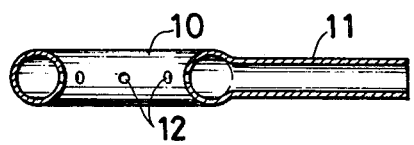
Figure 8A:
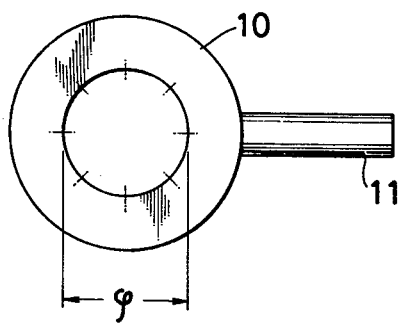
Figure 8B:
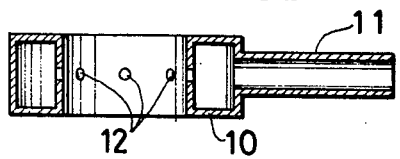
Figure 9A:
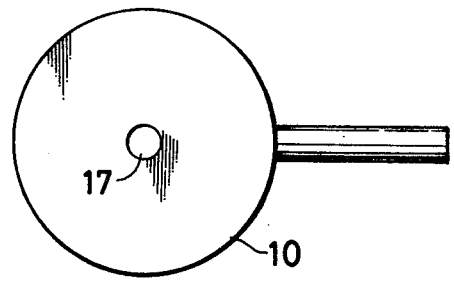
Figure 9B:
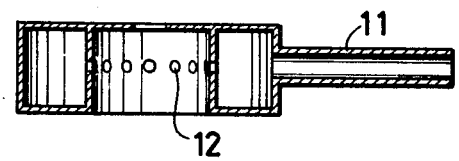
Figure 9C:
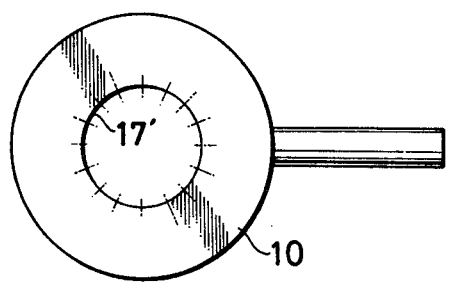

Referring to FIGS. 7a and 7b, FIGS. 8a and 8b, and FIGS. 9a and 9b and 9c, which show examples of the gas curtain devices of the invention, respectively, suitable as the material of the gas curtain device is a high heat resisting material such as quartz glass, high silica glass, ceramics and stainless steel. In the following, the case of employing quartz glass will be explained. FIGS. 7a, 8a and 9a are top views; FIGS. 7b, 8b and 9b are side sectional views; and FIG. 9c is a bottom view. Numeral 10 designates a ring-shaped tube, which is provided with eight to sixteen holes 12 of about 2 mm on the inner side thereof. The inside diameter $\varphi$ of the ring is made larger than the outside diameter of a preform to the extent that the preform will not touch it in any case. Radial broken lines in the top views and the bottom view of the respective examples indicate the positions of the holes.

Numeral 11 designates a gas conduit. A gas entering into the gas conduit is blown out through the holes 12 substantially uniformly, and is blown against the order peripheries of the preform and an optical fiber. The size of the holes 12 may be any desired size insofar as the gas is blown against the outer peripheral surfaces of the preform and the optical fiber substantially uniformly. Accordingly, the holes may be replaced by slits. There may also be adopted the structure or arrangement of the holes in which the gas is blown out downwards from the upper part of the ring-shaped tube 10 and upwards from the lower part. In the gas curtain device shown in FIG. 9, the diameter of a hole 17 in the upper surface is made somewhat larger than the outside diameter of the preform, and the inside diameter of the ring 17' in the lower surface is made still larger, so that the greater portion of the gas is directed downwards.

EMBODIMENT 1

Figure 10:
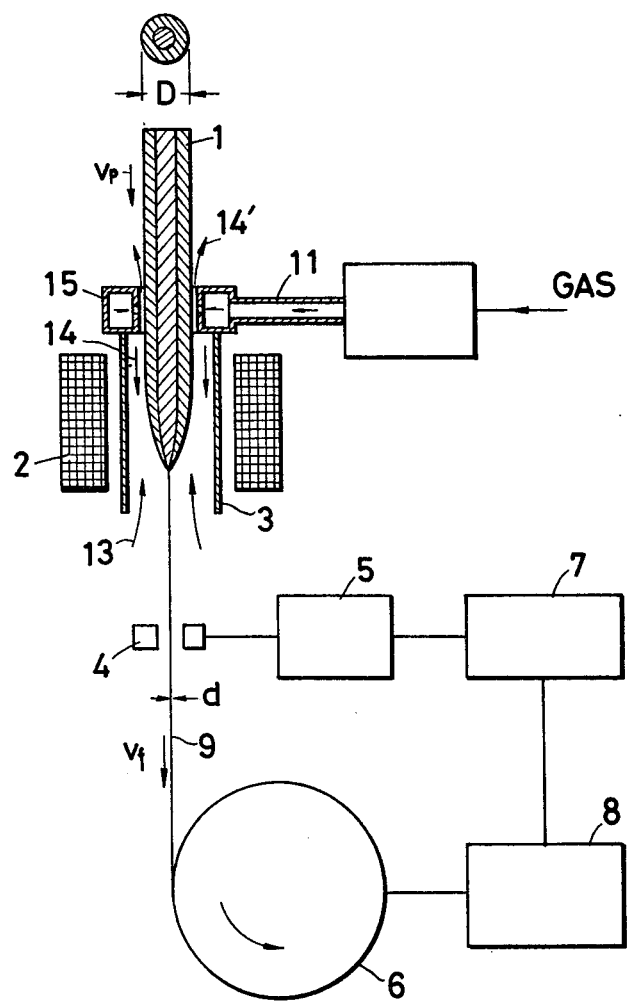
FIG. 10 is an explanatory view showing the construction of an embodiment of an optical fiber drawing apparatus according the invention.

FIG. 10 is an explanatory view showing the construction of an embodiment of the drawing apparatus of the invention in which the gas curtain device is provided. In this embodiment, the gas curtain device is arranged only above the furnace tube 3. In this case, the flow rate of the gas to be supplied from the gas conduit 11 of the gas curtain device is selected so as to suppress an air current 13 which blows upwards inside the furnace tube 3.

A portion of the gas blown out from the holes of the gas curtain device is blown upwards as indicated by arrows 14', and the other portion blows downwards inside the furnace tube 3 as indicated by arrows 14. Here, as the flow rate of the gas to be supplied from the gas conduit 11 of the gas curtain device is increased, the amount of suppression over the air current 13 blowing upwards inside the furnace tube 3 becomes larger, and the temperature distribution in the longitudinal direction of the furnace tube 3 can be gradually shifted downwards.

Figure 11:
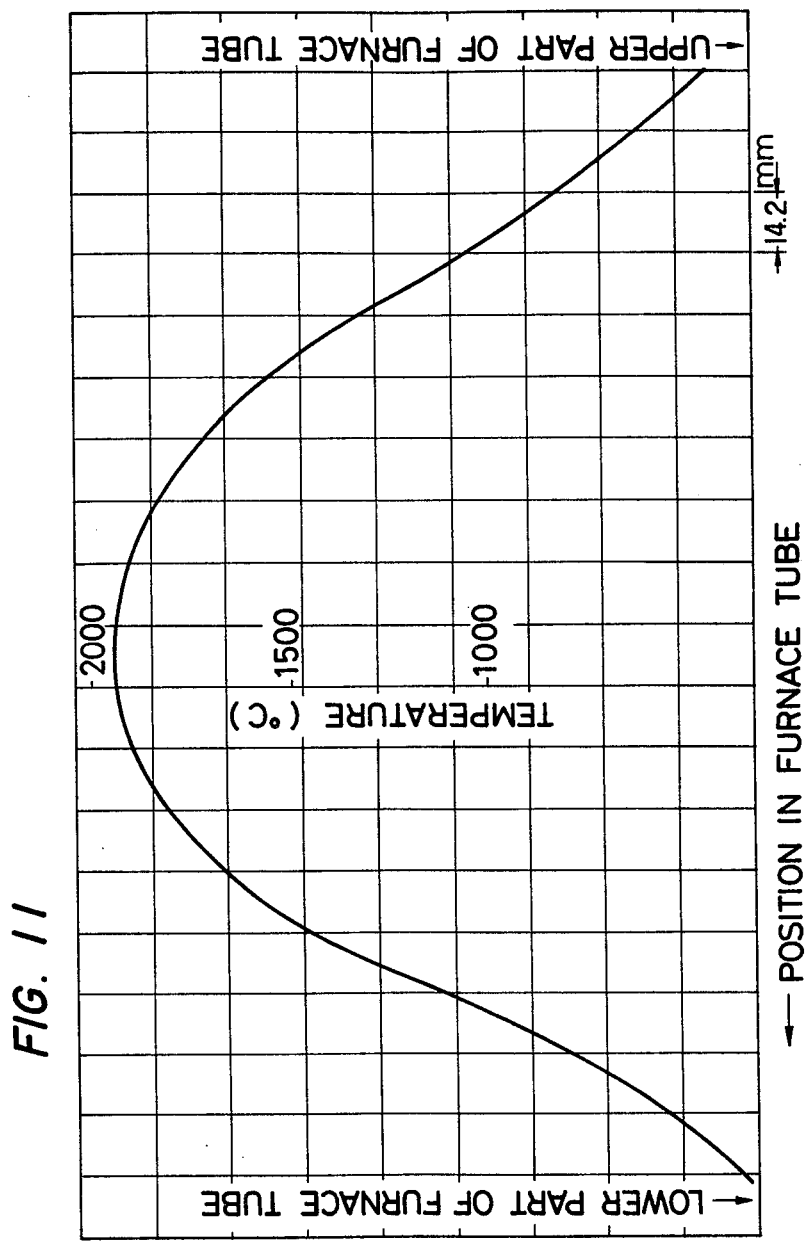
FIGS. 11 and 12 are diagrams of temperature distributions in a furnace tube in the embodiment of the optical fiber drawing apparatus according to the invention.
Figure 12:
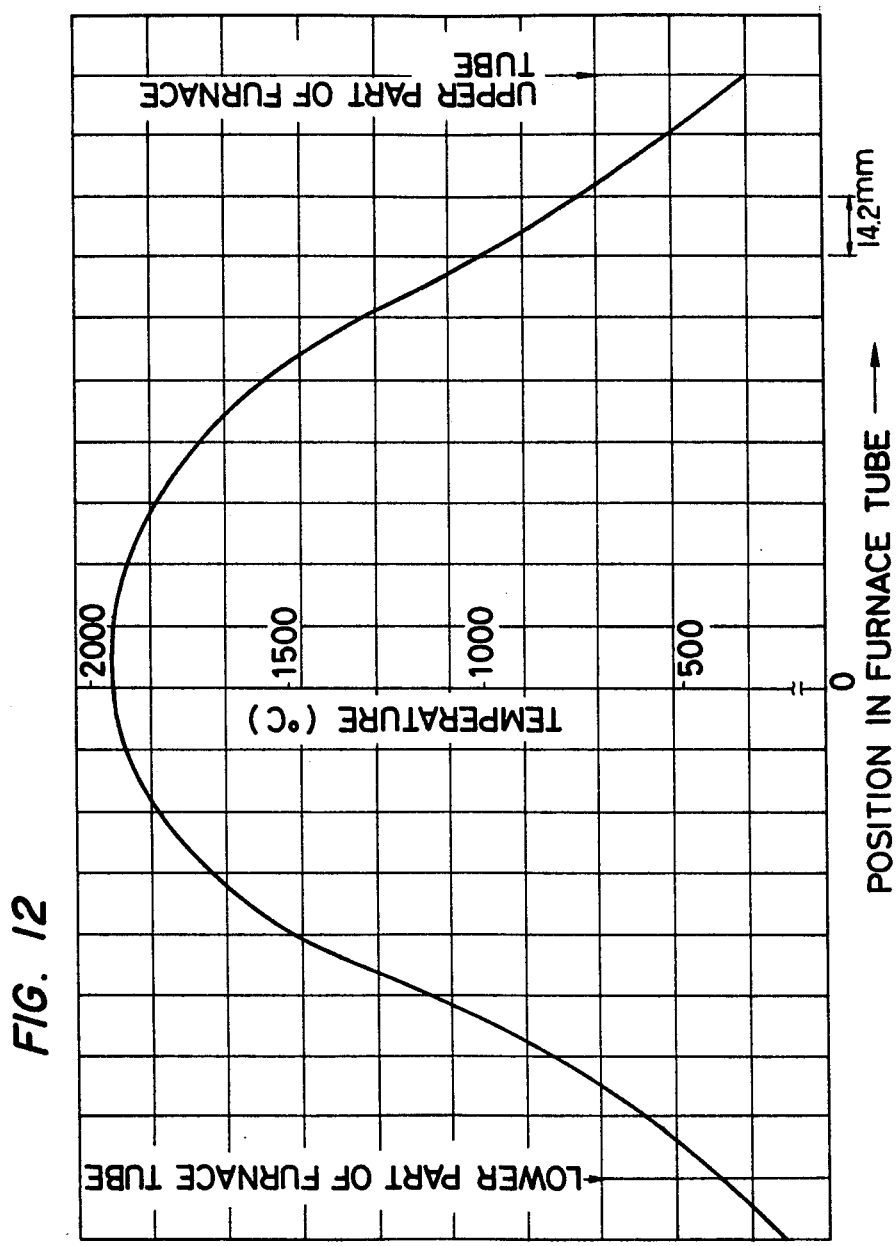
Figure 13A:
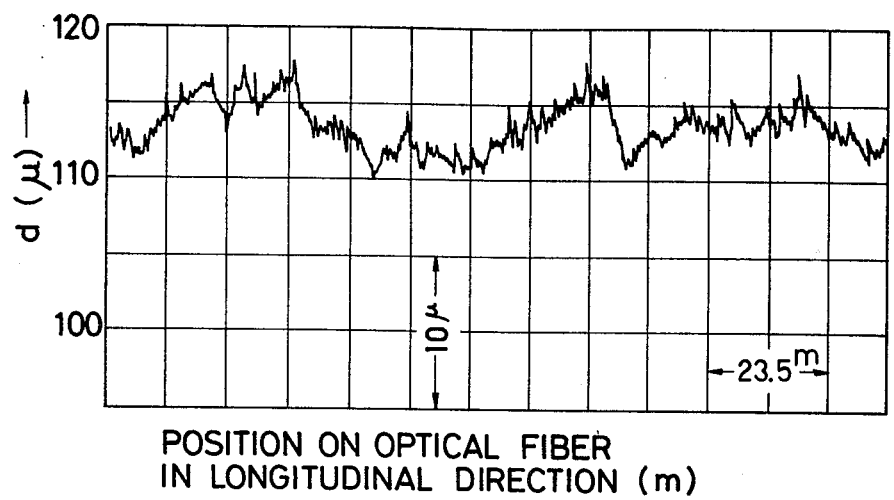
FIGS. 13a through 13f are diagrams showing the situations of diameter fluctuations of optical fibers manufactured by the embodiment of the optical fiber drawing apparatus according to the invention.
Figure 13B:
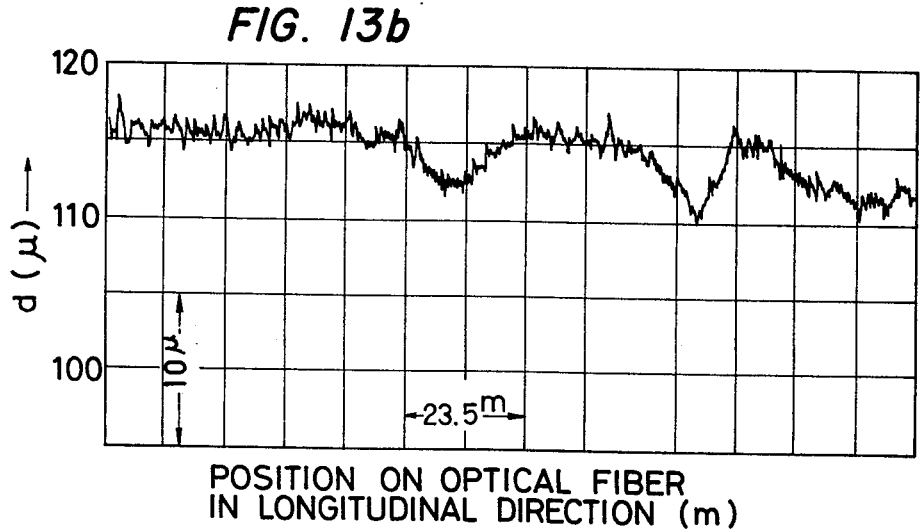
Figure 13C:
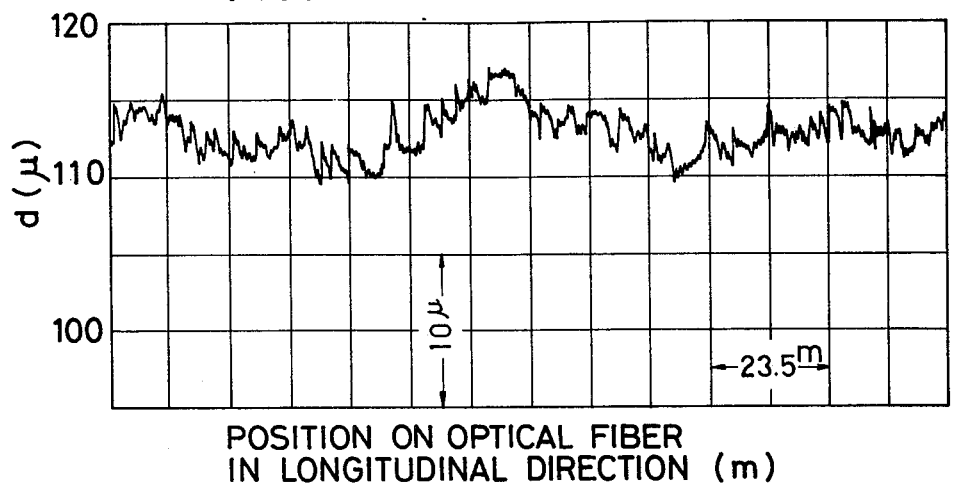
Figure 13D:
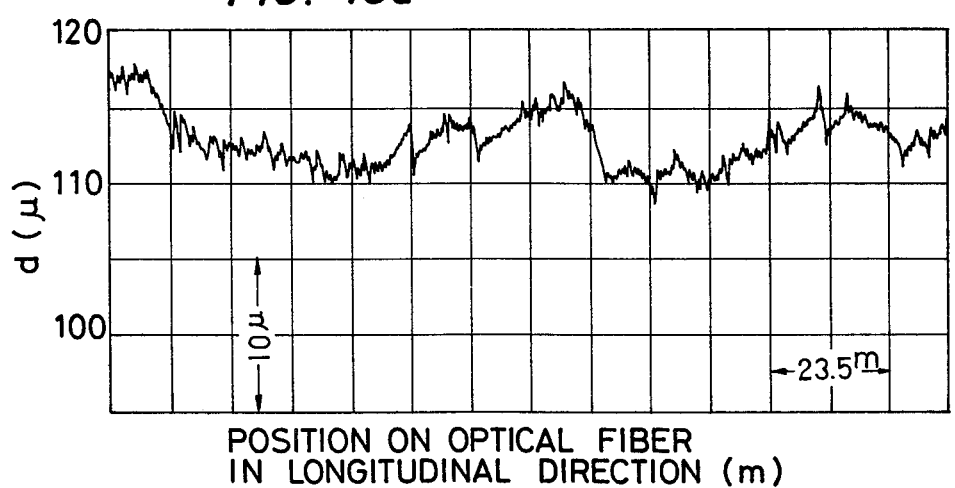
Figure 13E:
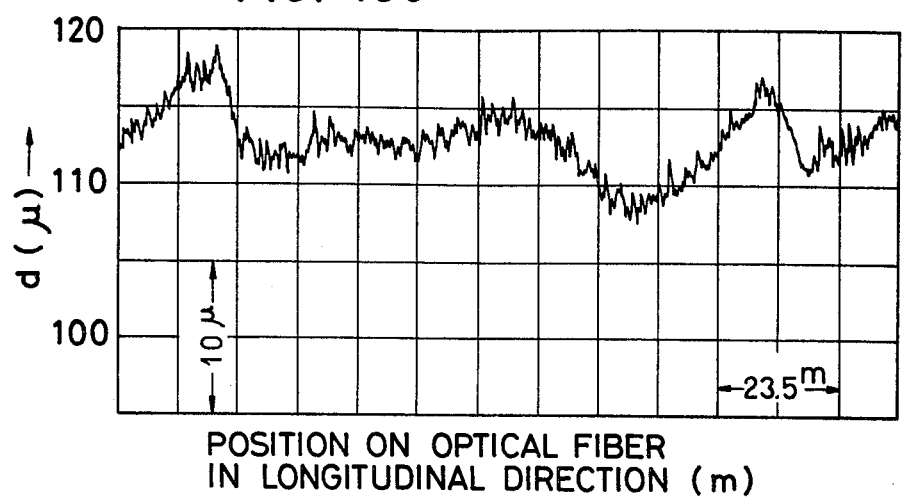
Figure 13F:
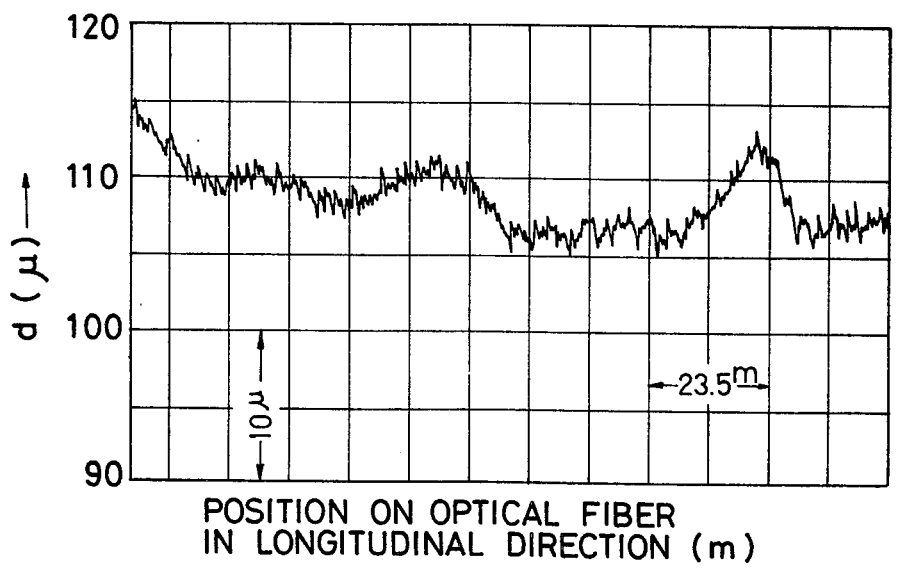

FIGS. 11 and 12 show the results of actual measurements of the temperature distribution in the longitudinal direction of the furnace tube 3 in the cases where the flow rates of the gas (in this case, $N_2$ gas) into the gas conduit were 50 l/hr and 250 l/hr, respectively. In each figure, the abscissa represents position in the furnace tube, and the ordinate represents temperature. By comparing FIGS. 11 and 12, it is understood that the temperature distribution shifts towards the lower part of the furnace tube with an increase of the gas flow rate.

Hereunder, description will be made of the characteristics of diameter fluctuations of optical fibers produced with the drawing apparatus of the invention shown in FIG. 10.

FIGS. 13a to 13f show examples of the fiber diameter fluctuation characteristics of optical fibers in the cases where the flow rates of the gas ($N_2$ gas) supplied from the gas conduit of the gas curtain device were 50, 100, 150, 200, 250 and 450 l/hr, respectively. The outside diameter D and the moving speed $v_p$ of the preform were 8 mm and 7.1 mm/min, respectively. Any of FIGS. 13a through 13f and FIGS. 14a through 14c to be described later illustrates a case where the optical fiber moved leftwards. In these figures, the abscissa represents the position on the optical fiber, and the ordinate represents the diameter d of the fiber.

Judging from the results of the actual measurements, an increase in the gas flow rate tends to make the fiber diameter fluctuations somewhat larger. This is interpreted to come from the fact that the amount of the gas flowing downwards inside the furnace tube 3 becomes more than the air current blowing upwards and conversely causes the fusion temperature to fluctuate. In any event, the results obtained are evidently more excellent than the results of the drawing by the prior-art drawing apparatus. Moreover, it has been ascertained that optical fibers having little diameter fluctuations can be stably obtained irrespective of disturbances such as the vibration of the preform ascribable to its contact with the cover and the change of the air current.

As an effect other than reducing the fiber diameter fluctuations, the drawing apparatus of the invention has a property suitable for the fiber diameter control. This will now be explained.

A requirement in the case of controlling the fiber diameter fluctuation by changing the take-up speed $v_f$ of the drum 6 in the fiber diameter control device shown in FIG. 1 is that the fiber diameter characteristic follows the change of the speed $v_f$ at the quickest possible response. The results of measurements of the response characteristics on the prior-art apparatus and the drawing apparatus of the invention are shown in FIGS. 14a through 14c.

Figure 14A:
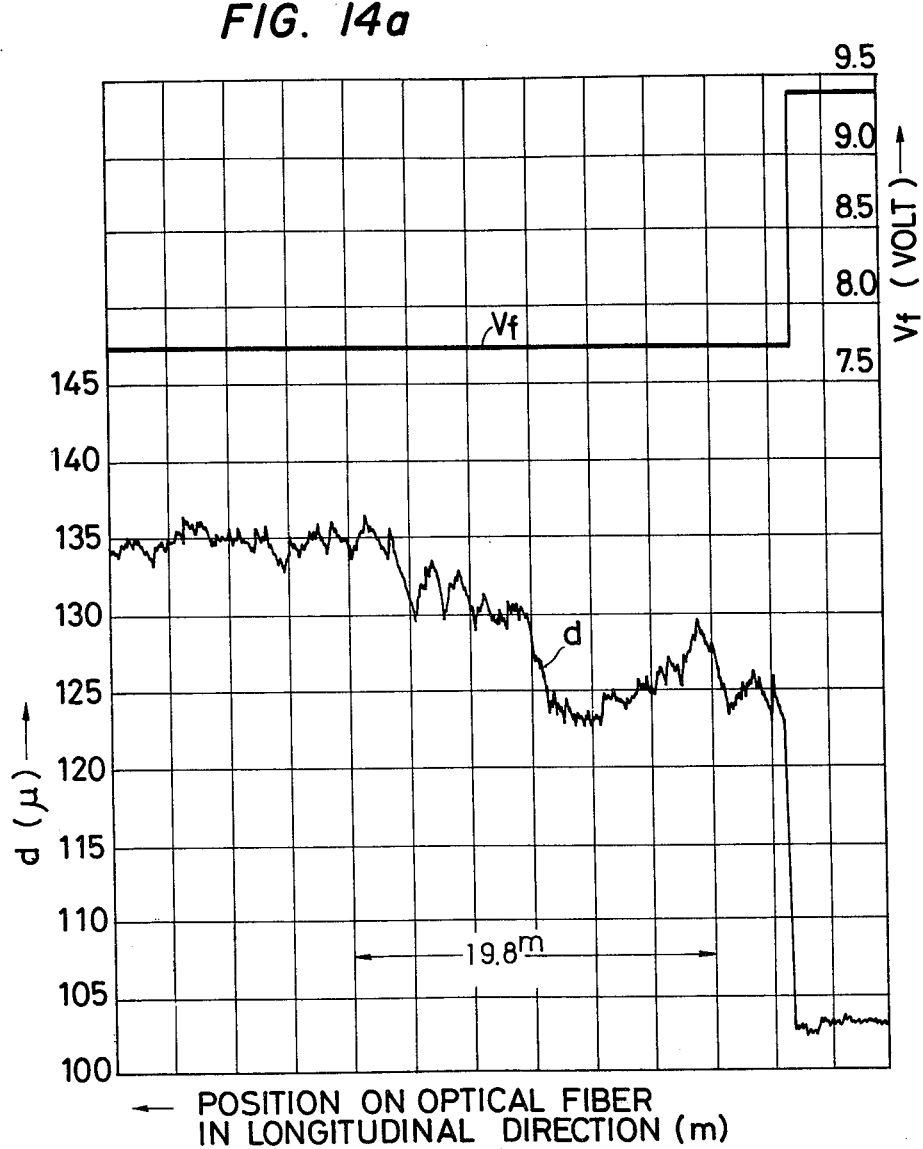
FIGS. 14a and 14b are diagrams showing characteristics of the response of optical fiber diameter fluctuations to changes of the fiber take-up speed in the prior-art drawing apparatus.
Figure 14B:
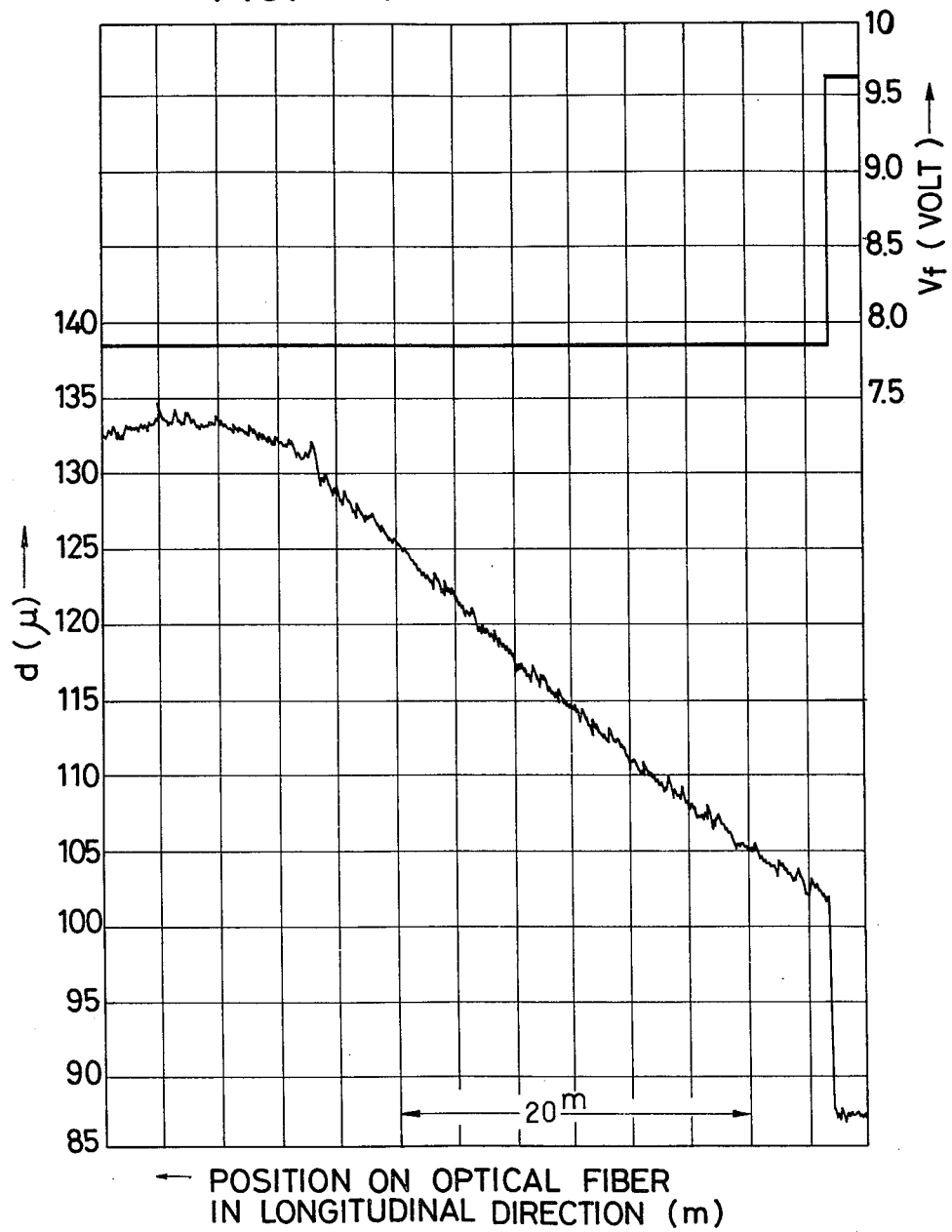

FIGS. 14a and 14b show the characteristics of the fiber diameter response to the stepped change of the take-up speed $v_f$ in the drawing apparatus of the prior art. FIG. 14a corresponds to a case where the prior-art furnace tube having no upper cover was employed, and FIG. 14b corresponds to a case where the furnace tube having the upper cover was employed. FIG. 14c corresponds to a case where the drawing apparatus of the invention shown in FIG. 10 was employed and where the temperature distribution of the furnace tube shown in FIG. 12 was applied. In FIGS. 14a through 14c, $V_f$ denotes d.c. voltages which were applied to the d.c. motor for driving the drum, and the take-up speed of the drum changed substantially in proportion to the voltage $V_f$.

As is apparent from the results of the actual measurements, in the case of FIG. 14a, although the fiber diameter response time is short, the fiber diameter fluctuations are too large. In the case of FIG. 14b, although the fiber diameter fluctuations are small, the fiber diameter response time is about 1.5 times as long as that in the case of FIG. 14a. On the other hand, in the case of FIG. 14c, according to the invention, the fiber diameter response time is the shortest, and the fiber diameter fluctuations are small. Accordingly, fiber diameter control is easy, and it is possible to make the fiber diameter fluctuations of the optical fiber below ±1%.

EMBODIMENT 2

Figure 15:
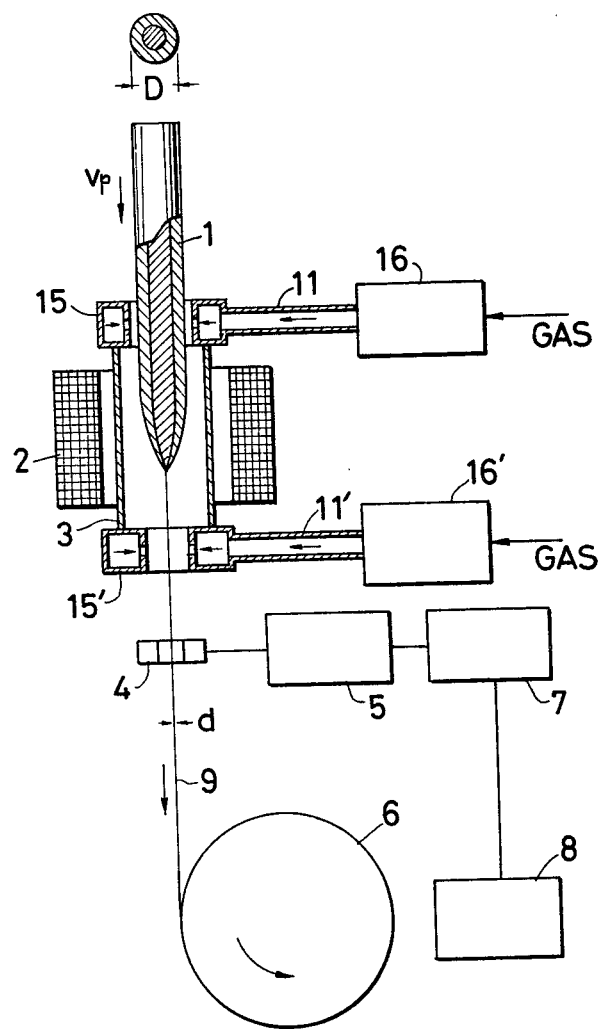
FIG. 15 is an explanatory view showing the construction of another embodiment of the optical fiber drawing apparatus according to the invention.

FIG. 15 shows an embodiment of the optical fiber drawing apparatus in which the gas curtain devices 15 and 15' are arranged above and below the furnace tube 3. In this case, as understood from the explanation of Embodiment 1, the difference between the flow rate of the gas which is supplied from the gas conduit 11 of the upper gas curtain device and which flows out downwards and the flow rate of the gas which is supplied from the gas conduit 11' of the lower gas curtain device and which flows out upwards may be selected so as to become equal to or greater than the flow rate of air current which blows upwards inside the furnace tube 3. In this way, the fluctuations of the fusion temperature attributed to the changes of the air current are prevented. and optical fibers having small fiber diameter fluctuations can be realized.

As an additional effect of the drawing apparatuses of Embodiments 1 and 2, the following point is mentioned. Heretofore, an alumina tube (trade name, Al-23) has been used as the furnace tube, and it has been damaged and replaced when used in ten times or so. It has been revealed that the life becomes almost twice longer when the gas curtain device of this invention is employed.

As set forth above, according to the drawing apparatuses of the invention given in Embodiments 1 and 2, the influence of the air current can be suppressed by employing the gas curtain device or devices. As a result, the following effects can be achieved. (1) The drawing in which the fiber diameter fluctuations of the optical fiber are slight and which is stable against disturbances is carried out. (2) The fiber diameter response of the optical fiber is quick to the change of the number of revolutions of the take-up drum, so that fiber diameter fluctuations are small. (3) Where the indirect heating means employing the furnace tube is used, the life of the furnace tube is extended.

Description will now be made of an optical fiber drawing apparatus which has means for effecting the fiber diameter control of an optical fiber by changing the gas flow rate.

Figure 16:
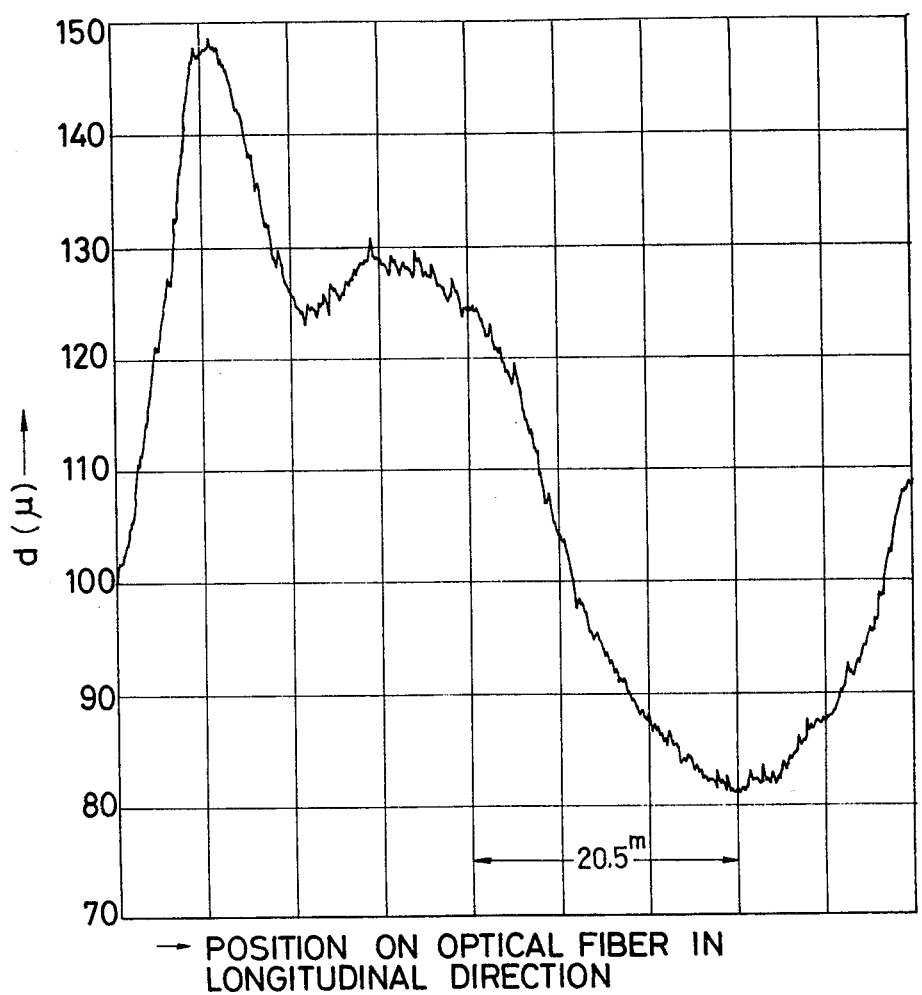
FIGS. 16 and 17 are diagrams showing the situations of diameter fluctuations of optical fibers manufactured by the prior-art apparatus in case where a preform has fluctuations in the outside diameter.
Figure 17:
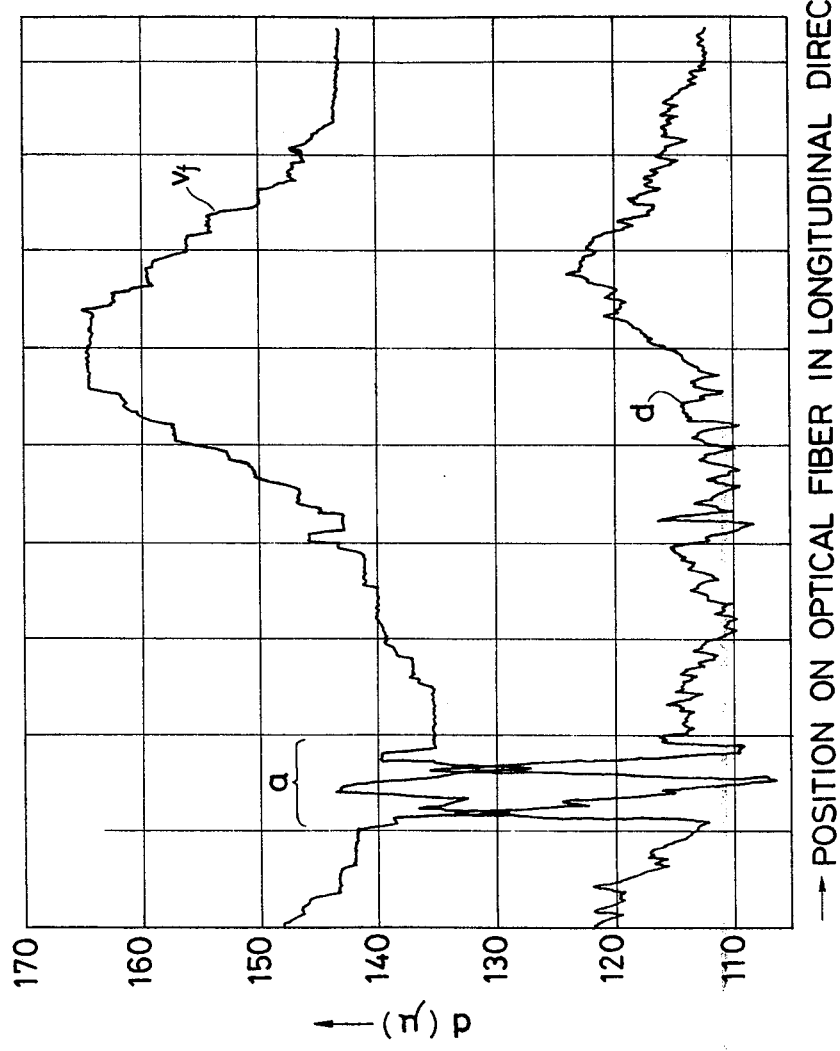

FIGS. 16 and 17 show the characteristics of diameter fluctuations of an optical fiber in the case where a preform having outside diameter variations of ±3.2 to ±3.9% was drawn. FIG. 16 shows the diameter fluctuation characteristic before executing the fiber diameter control, and FIG. 17 the fiber diameter fluctuation characteristic in the case of executing the control by changing the speed of revolutions of the motor, i.e., the voltage $v_f$ applied to the d.c. motor for driving the drum. In both cases, the apparatus shown in FIG. 1 was used.

As shown in FIG. 16, when fiber diameter control was not conducted, diameter fluctuations of the optical fiber became amplified to the extent of 3 to 10 times the outside diameter variations of the preform. The amplification degree exhibited the tendency of becoming larger with an increase in the outside diameter variations of the preform. As is shown in FIG. 17, even when it was intended to obtain an optical fiber of uniform wire diameter under the proportional control by regulating the speed of revolutions of the motor according to the diameter variations of the preform, the fiber diameter could not be perfectly controlled as the diameter variations of the preform were too large, and the diameter fluctuations of the optical fiber were about ±7% in the steady state value. An example of the control of the diameter fluctuations of an optical fiber ascribable to the air current change which was caused by the contact of the preform with the cover of brick as previously stated is illustrated at a part $a$ in FIG. 17. In this case, the diameter fluctuations of the optical fiber were about ±12%.

In any of FIGS. 16 and 17 referred to above and FIGS. 19, 23, 26 and 27, to be described later, which show the diameter fluctuation characteristics of optical fibers, the abscissa represents the position on the optical fiber, and the ordinate represents the diameter $d$ of the fiber. The optical fibers were moved rightwards as viewed along the abscissa.

Where the outside diameter of the preform varies as stated above, the optical fiber obtained by drawing the preform exhibits the characteristic of fiber diameter fluctuations amplified to the extent of 3 to 10 times the outside diameter variations of the preform. Where the amplification degree is great and where the fiber diameter fluctuations arise in a short period, it is difficult to control the diameter fluctuations of the optical fiber highly precisely.

The above description has been made of the case where the gas curtain device is not employed. Even when the optical fiber drawing apparatus with the gas curtain device or devices as shown in Embodiment 1 or 2 is used, only the fiber diameter fluctuations due to the disturbances are suppressed, and as to the prevention of the fluctuations of the optical fiber diameter ascribable to the outside diameter variations of the preform, no favorable result is obtained and it can be said that essentially the situation is the same as in the case of employing the prior art.

A drawing apparatus therefore employs the foregoing gas curtain device in order to suppress the fiber diameter fluctuations due to the disturbances, and simultaneously has, in order to cope with the outside diameter variations of the preform, means for performing the fiber diameter control by changing the amount of the gas flowing along the outer peripheral surface of the fused part of the preform. This will now be described.

EMBODIMENT 3

Figure 18:
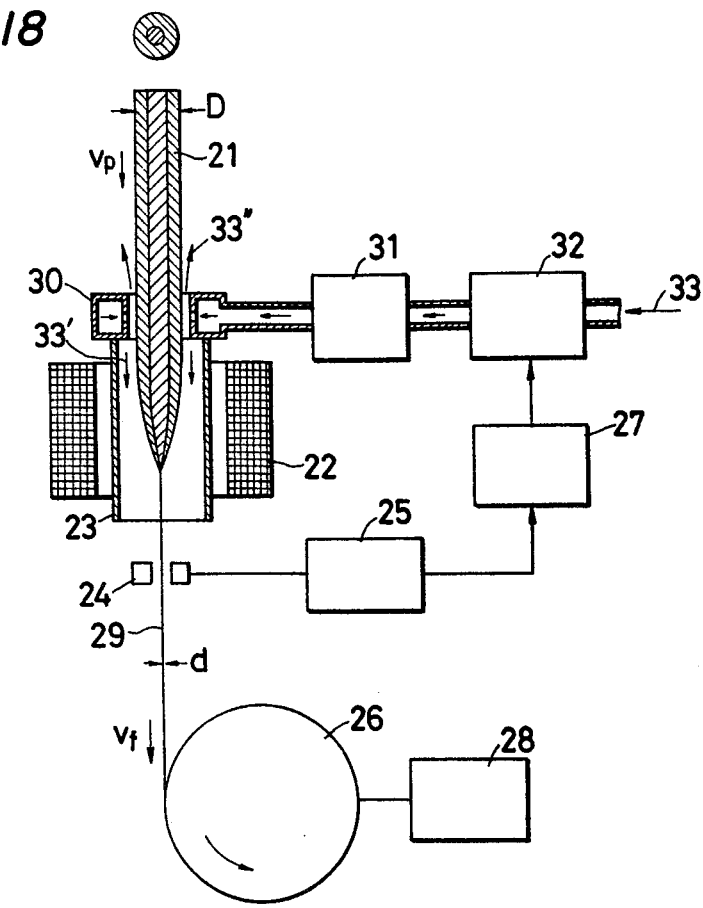
FIGS. 18 and 20 are explanatory views each showing the construction of an embodiment of the optical fiber drawing apparatus according to the invention.
Figure 19:
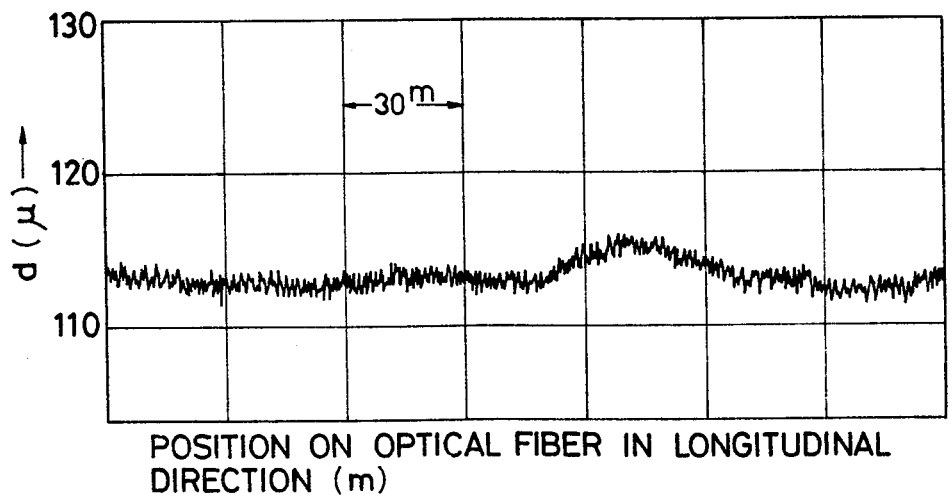
FIG. 19 is a diagram showing the situation diameter fluctuations of an optical fiber manufactured without performing the fiber diameter control in the embodiment of the optical fiber drawing apparatus according to the invention.

FIG. 18 shows the schematic construction of an embodiment of the optical fiber drawing apparatus according to the invention. In this case, the feed speed $v_p$ of a preform 21 into a furnace tube 23 and the take-up speed $v_f$ of a drum 26 are maintained constant. A gas (an inert gas or oxidizing gas such as Ar, $N_2$, $O_2$ and $CO_2$, or an oxidizing gas containing a reactive gas for forming a glass film) is introduced into a gas curtain device 30 mounted above the furnace tube 23 as indicated by an arrow 33, and is caused to flow out in the directions of arrows 33' and 33'' or only in the direction of arrow 33'. Further, the flow rate of the gas flowing in the direction of arrow 33' is set at a value which is sufficient to suppress the air current flowing up from below the furnace tube 23 and which is less than 6 l/min. By such a setting, if the outside diameter variations of the preform 21 are within ±1%, a fluctuation characteristic of the optical fiber diameter as shown in FIG. 19 is obtained, and an optical fiber 29 having almost no diameter fluctuation can be produced.

Description will now be made of the control for making the diameter of the optical fiber uniform where the diameter of the optical fiber fluctuates by $\pm \Delta d\%$ due to outside diameter variations $\pm \Delta D\%$ of the preform. First, the diameter of the optical fiber 29 is detected by a detector 24, the detected fiber diameter is converted into a voltage (or current) by a fiber diameter measuring instrument 25, and the output signal is applied to a control circuit 27. Subsequently, it is compared with a reference voltage at $\Delta d = 0$. When the diameter of the optical fiber differs from the reference value, an output signal of the control circuit 27 is applied to a valve opening-and-shutting unit 32 for controlling the gas flow rate so as to actuate it. Thus, the control is carried out so that when the diameter of the optical fiber is smaller than the reference value, the flow rate of the gas passing through a flow meter 31 is decreased, and that when the fiber diameter is conversely larger, the flow rate is increased.

In this case, when the gas flow rate is changed, the diameter of the optical fiber changes transiently, whereupon it gradually returns to the original steady value. The invention renders the fiber diameter uniform in such a way that, when the fluctuation of the optical fiber diameter has been detected, the transient change of the fiber diameter as stated above is generated by changing the gas flow rate, to thereby cancel the fiber diameter fluctuation. Hereunder, the principle of the optical fiber diameter control in the present embodiment will be qualitatively explained.

When the flow rate of the gas to be fed into the gas curtain device 30 as indicated by the arrow 33 in FIG. 18 increases, the temperature distribution in the furnace tube 23 shifts downwards. Conversely, when the flow rate of the gas decreases, the temperature distribution in the furnace tube 23 shifts upwards. When the temperature distribution in the furnace tube shifts up or down during the drawing in this manner, the viscosity $\eta$ and elastic constants (E: Young's modulus, $\nu$:Poisson's ratio) of a glass part heated and fused in deforming the preform into the optical fiber change. For this reason, even when the feed-in speed of the preform and the take-up speed of the optical fiber are constant, the speed of the deformation from the preform to the optical fiber changes temporarily, and the shape of the deformed part can be changed transiently. Accordingly, the diameter of the optical fiber can be controlled by generating the transient change so as to cancel the fiber diameter fluctuation.

Here, the speed of the deformation from the preform to the optical fiber is given by the following equation when Maxwell's visco-elasto theory (Phil. Trans. Roy. Soc. London, 157, 1867, 49) is applied:

$$dS/dt = (1/\eta)PA + [2(1 + v)/E][dPA/dt] \quad (1)$$

where
S: deformation value,
A: sectional area of the preform,
P: tension exerted on the optical fiber at the drawing.

As will be understood from Equation (1), the prior-art system for controlling the diameter of the optical fiber by changing the take-up speed of the drum intends to attain the desired fiber diameter $d$ by changing the take-up speed $v_f$ since the following relation holds in the steady state:

$$d = \sqrt{(v_p/v_f)} D$$

From the transient viewpoint, it is considered that the fiber diameter is controlled by changing the tensile strength P and thus changing the speed of the deformation (i.e., the transient shape in which the preform is going to become the optical fiber). In contrast, the control system of the invention is characterized in that the diameter is controlled by changing $\eta$, E and $v$, as explained previously.

EMBODIMENT 4

Figure 20:
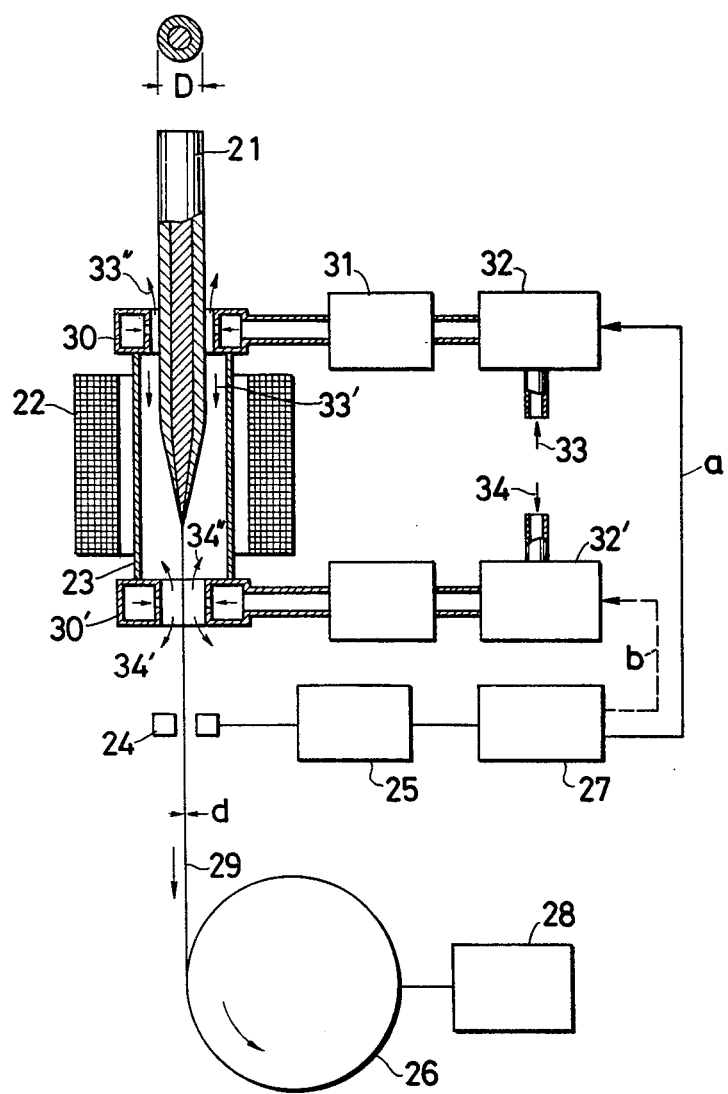

FIG. 20 shows the schematic construction of another embodiment of the invention. It is characterized by controlling the diameter of the optical fiber in such a way that the gas curtain devices are provided above and below the furnace tube 23 and that the flow rates of the gas to be fed into the gas curtain devices are changed under the state under which the air current intending to blow upwards and its changes are sufficiently suppressed. In this case, the flow rate of the gas to be fed into the lower gas curtain device 30', as indicated by an arrow 34, is set so that the gas may flow out in the directions of arrows 34' and 34" or only in the direction of arrows 34'. The flow rate of the gas flowing out in the direction 34' is set at an amount sufficient to suppress the air current intending to blow upwards from below the furnace tube 23.

The optical fiber diameter control of this apparatus employs two methods. In one method, the flow rate of the gas to be fed into the gas curtain device 30' as indicated by the arrow 34, is held constant, the output signal of a control circuit 27 is fed back to a valve opening-and-shutting unit 32, as indicated at $a$, and the flow rate of the gas to be fed to the gas curtain device 30 is changed, whereby the diameter of the optical fiber is controlled. In the other method, conversely, the flow rate of the gas to be fed into the gas curtain device 30 is held constant, the output signal of the control circuit 27 is fed back to a valve opening-and-shutting unit 32' as indicated by a broken line $b$, and the flow rate of the gas into the gas curtain device 30' is changed.

Description will now be made of the results of the control of the optical fiber drawing apparatus according to the invention. The drawing apparatus used was that shown in FIG. 18. Employed as the gas curtain device was that shown in FIGS. 9a through 9c. Regarding the dimensions of the gas curtain device, the outside diameter of the top surface was 55 mm, the diameter of the hole 17 was 10 mm, the height of the ring-shaped pipe was 20 mm, the inside diameter of the ring was 27 mm, and the diameter of the gas outflow aperture 12 was 2 mm. The number of the outflow apertures was 16.

Figure 21:
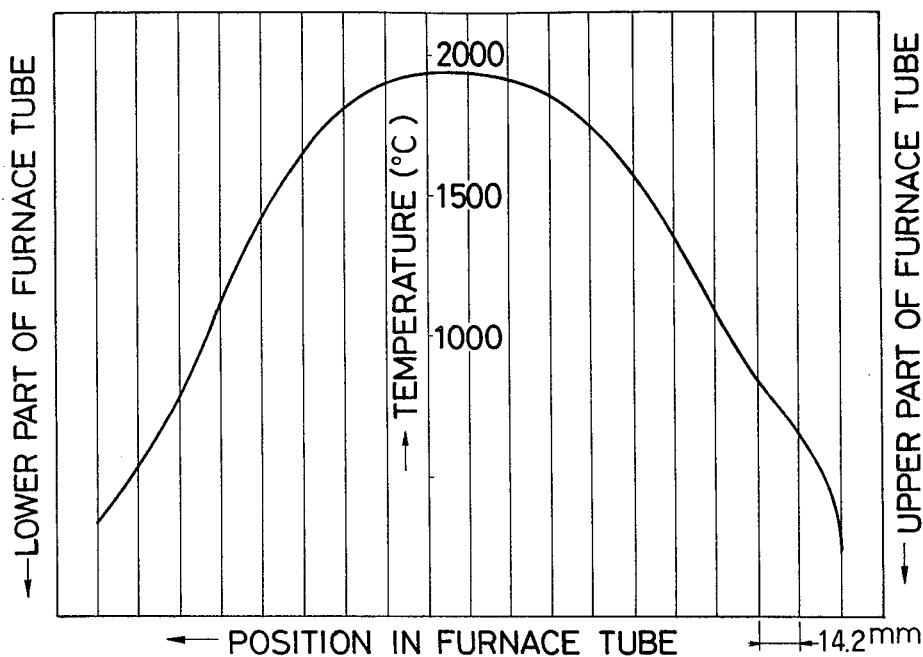
FIGS. 21 and 22 are diagrams of temperature distributions in a furance tube in the embodiment of the apparatus according to the invention.
Figure 22:
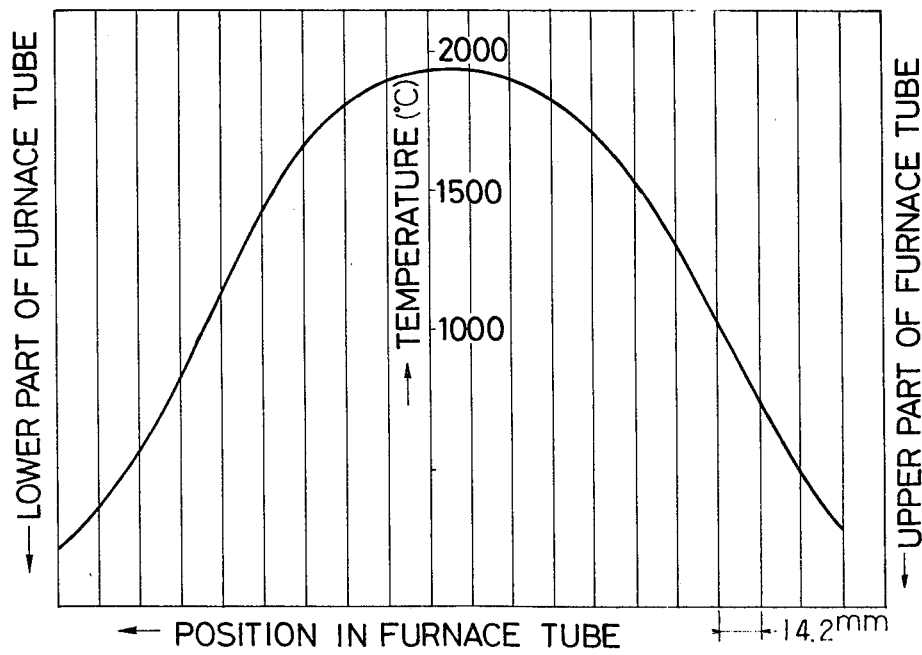

FIGS. 21 and 22 illustrate the temperature distributions in the longitudinal direction of the furnace tube 23, with the parameter being the flow rate of the gas fed into the gas curtain device. FIG. 21 corresponds to a case where 100 l/hr of $N_2$ gas was caused to flow, and FIG. 22 a case where 250 l/hr of $N_2$ gas was caused to flow. These characteristics of temperature distributions are those in the case where the values of the gas flow rates were steady values. As the gas flow rate increases, the temperature distribution somewhat shifts towards the lower part of the furnace tube. From this fact, it is thought that, when the gas flow rate increases in a stepped manner, the temperature distribution in the furnace tube 23 under the transient state will shift downwards in proportion to the gas flow rate.

Figure 23:
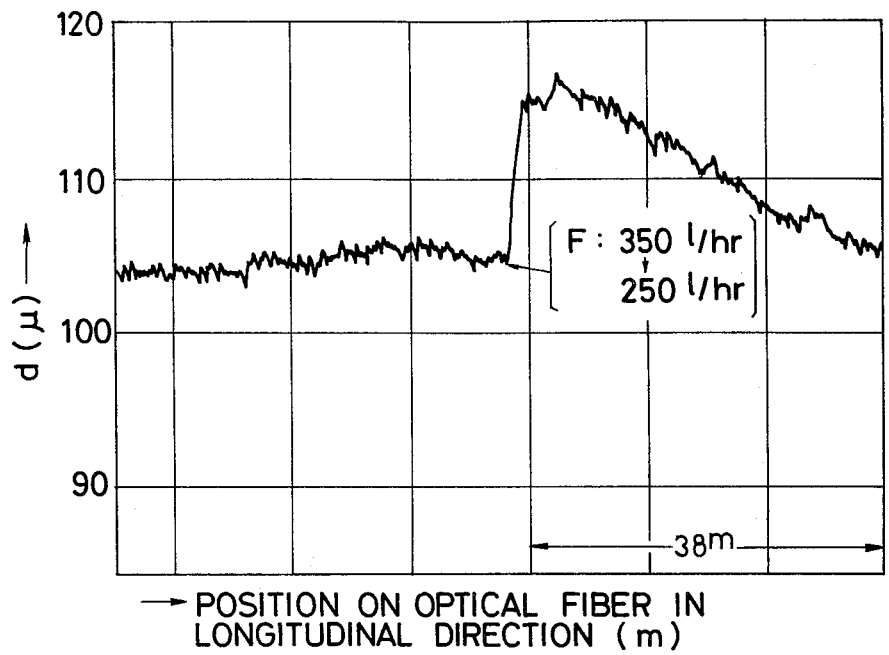
FIG. 23 is a diagram showning the situation of diameter fluctuations of an optical fiber manufactured by changing the flow rate of a gas in a stepped manner in the embodiment of the optical fiber drawing apparatus according to the invention.

FIG. 23 shows an example of the result of actual measurement of the fiber diameter response characteristic of an optical fiber in the case where the flow rate of the gas to be fed into the gas curtain device was changed from 350 l/hr to 250 l/hr in a stepped manner at a point indicated by an arrow. In this case, the quantities $v_f$, $v_p$ and D were kept constant, and only the gas flow rate was changed in the stepped manner at the point of arrow. The result indicates that the diameter of the optical fiber can be transiently changed in response to the stepped change of the gas flow rate. The fiber diameter thereafter returns to the original set value.

Figure 24:
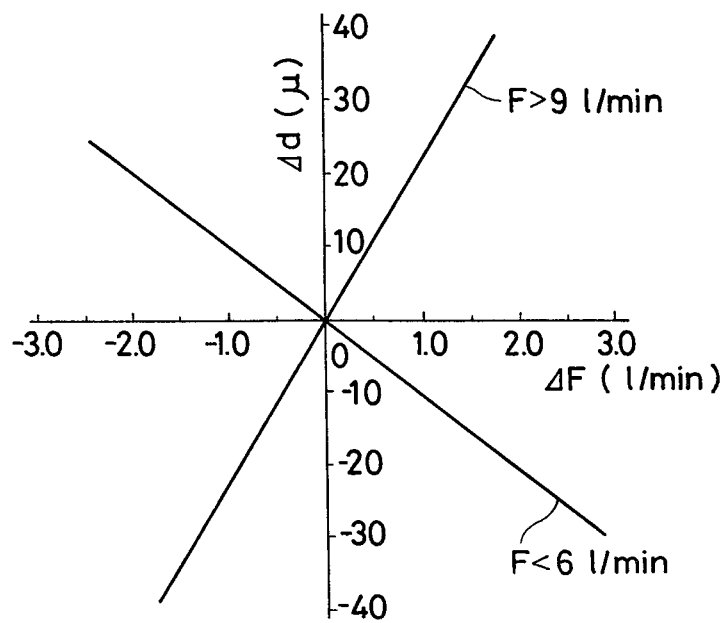
FIG. 24 is a diagram showing the relationship between the diameter fluctuations and the gas flow rates as to the optical fiber manufactured by the embodiment of the apparatus according to the invention.

FIG. 24 collectively illustrates the results described above. It indicates that the amount of the maximum change of the diameter of the optical fiber in the transient state (on the axis of ordinate) is proportional to the stepped change of the gas flow rate (on the axis of abscissa). However, the case where the average flow rate F is below 6 l/min and the case where it is 9 l/min have quite different constants of proportion. In the former case, the fiber diameter decreases with the increase of the gas flow rate, whereas in the latter case, it increases with the increase of the gas flow rate. Accordingly, the average gas flow rate should be made below 6 l/min (on condition that it is above 0.5 l/min) or above 9 l/min, and the range of 6 – 9 l/min had better be avoided. As previously explained, in this range, there exist average flow rates which have no considerable influence on the optical fiber diameter even when the gas flow rate is changed. In FIG. 24, F designates the average gas flow rate, $\Delta F$ the amount of change of the gas flow rate, and $\Delta d$ the amount of change of the diameter of the optical fiber.

Figure 25:
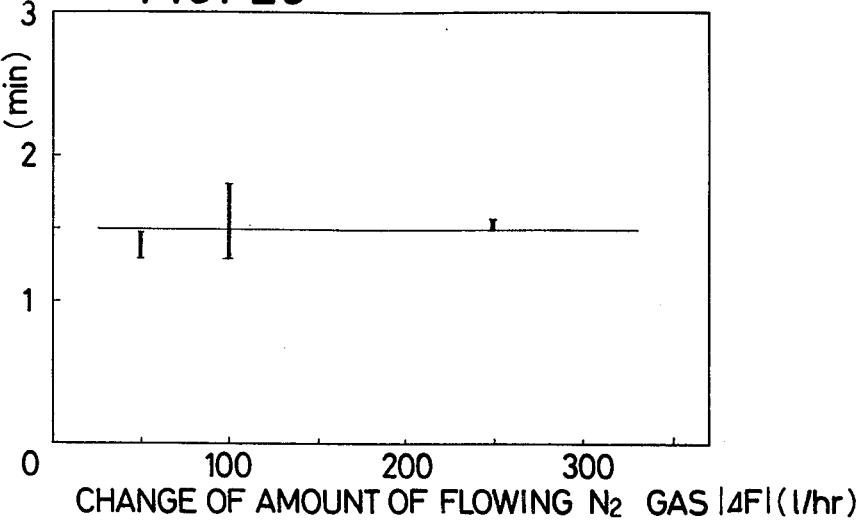
FIG. 25 is a diagram showing in relation to the change of the gas flow rate the time in which the fiber diameter having changed due to the change of the gas flow rate returns to the original state in the embodiment of the apparatus according to the invention.

There has been obtained the result that, as illustrated in FIG. 25, the time $t_s$ in which the optical fiber diameter responsive to the stepped change of the gas flow rate settles from the transient change to the original steady value is substantially independent of the value of the gas flow rate change. In FIG. 25, the abscissa represents the absolute value of the amount of change of the gas flow rate, and the ordinate represents the time $t_s$. It is, accordingly, understood that the diameter fluctuations of the optical fiber ascribable to the outside diameter variations of the preform can be easily controlled by changing the gas flow rate.

Figure 26:
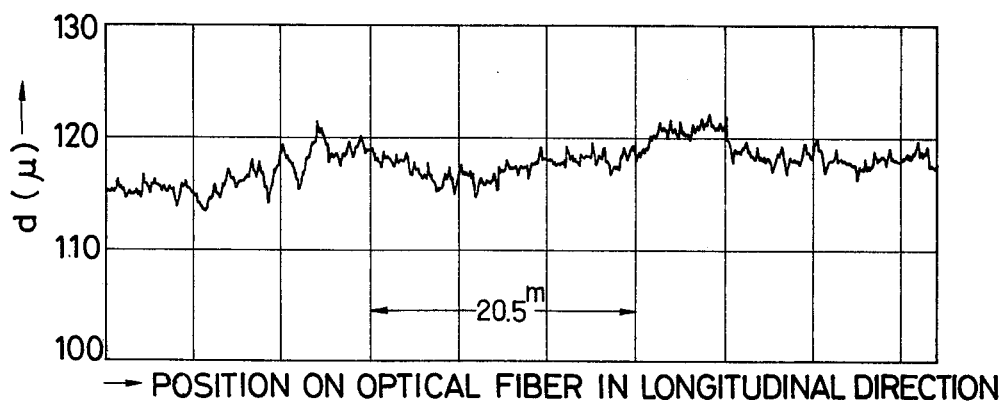
FIGS. 26 and 27 are diagrams showing the situations of diameter fluctuations of optical fibers manufactured by the apparatus of the embodiment of the invention in case where preforms have variations in the outside diameter.
Figure 27:
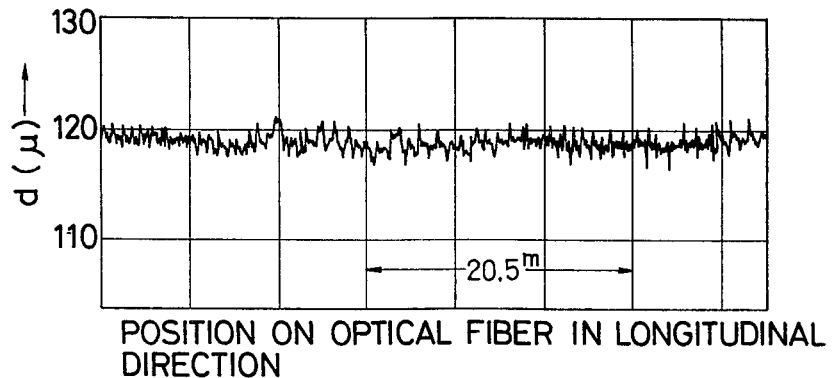

Description will now be made of an example of the result of the fiber diameter control in the case where a preform having outside diameter variations was drawn by the use of the apparatus shown in FIG. 18. FIG. 26 shows the diameter fluctuation characteristic of an optical fiber which was obtained in such a way that the preform employed in the measurements of FIGS. 16 and 17 and having the outside diameter variations $\pm \Delta D$ of $\pm 3.2$ to $\pm 3.9\%$ was drawn while carrying out the fiber diameter control. The fiber diameter fluctuation characteristic which had been as in FIG. 16 ($\pm$ about 32%) before performing the fiber diameter control could be suppressed to about $\frac{1}{8}$ ($\pm$ about 4%) by the employment of the drawing apparatus of the invention. Moreover, there appeared the effects of the invention that the fiber diameter fluctuations due to the disturbances as in FIG. 17 do not occur and that hunting of the fiber diameter fluctuation due to a follow-up change of the take-up speed of the drum does not arise. FIG. 27 shows the diameter fluctuation characteristic of an optical fiber in the case where a preform having outside diameter variations of about $\pm 2\%$ was drawn by the use of the fiber diameter control device of the invention. In this case, the diameter fluctuations of the optical fiber could be controlled to within $\pm 1.5\%$.

As is apparent from the above examples of the actual measurements, the fiber diameter control device of the invention can suppress diameter fluctuations of the optical fiber ascribable to the disturbances into the substantially perfect state, and can easily control the diameter fluctuations of the optical fiber ascribable to the outside diameter variations of the preform by the simple operation of merely changing the flow rate of the gas to be fed into the gas curtain device. Since the drum is merely rotated at the fixed take-up speed, it is unnecessary to consider such problems that the diameter fluctuation of the optical fiber causes hunting on account of the difference of the time constants at the acceleration and deceleration of the drum or the difference of the load inertias as in the prior art and that where the outside diameter variations of the preform are accumulated at a short period, the diameter fluctuation of the optical fiber causes hunting by the follow-up control of the take-up speed of the drum.

The fiber diameter control device of the invention is not restricted to the above embodiments. By way of example, in order to feed the gas into the furnace tube 23, any means of capable of feeding the gas into the furnace tube 23 may be employed without using the gas curtain device shown. Where the outside diameter variations of the preform are extremely large or where the outside diameter of the preform varies continuously as in a tapered shape, it is necessary for the control to change both the take-up speed of the drum and the flow rate of the gas to be fed into the gas curtain device.

As explained above, according to the invention, the fiber diameter control can be executed in such a way that the flow rate of the gas to be fed into the furnace tube is changed in response to the fluctuation of the optical fiber diameter and that the fiber diameter fluctuation is canceled by the transient change of the fiber diameter. Thus, the invention is greatly effective.

As explained previously, where the outside diameter variations of the preform are as large as $\pm 2$ to $\pm 4\%$, the diameter fluctuations of the optical fiber become $\pm 8\%$ to $\pm 32\%$ if the drawing is executed without controlling the outside diameter variations. When it is intended to control the fiber diameter fluctuations by the foregoing fiber diameter control method according to the invention, the flow rate of the gas to be fed into the furnace tube must be changed by $\pm$ about 200 l/hr as is apparent from the characteristic of FIG. 24, indicating the maximum value of the fiber diameter change in the transient state responsive to the stepped change of the gas flow rate. Accordingly, the gas flow rate F of the flow meter 31 to be initially set, must include the component of gas flow rate change of $\pm$ 200 l/hr necessary for controlling the fiber diameter fluctuations attributed to the outside diameter variations of the preform and the gas flow rate sufficient for suppressing the fiber diameter fluctuations attributed to the disturbances. However, with the method wherein the amount of the gas flowing through the flow meter 31 is changed by about $\pm 200$ l/hr by means of the valve opening-and-shutting unit for controlling the gas flow rate 32 where such a large amount of gas is caused to flow, highly precise control of the gas flow rate is difficult. In order to perform a highly precise control by this method, the valve opening-and-shutting unit 32 for controlling the gas flow rate must have a precision mechanism which can finely adjust the gas flow rate over a wide flow rate range. This is extremely expensive. Where the gas flow rate F of the flow meter 31 is set at first erroneously at a value which is slightly larger than the amount of control of the gas flow rate described previously (200 l/hr), there exists a state in which the gas passing through the flow meter 31 is of a slight amount close to zero. In such a state, it becomes impossible to suppress the fiber diameter fluctuations ascribable to the disturbances. When the gas flow rate is zero, obviously fiber diameter fluctuations ascribable to the disturbances arise. These fiber diameter fluctuations, however, do not readily arise when suppressing the changes of the air current in the furnace tube and keeping the interior of the tube in the laminar flow state with the increase of the gas flow rate. When the gas flow rate F to be initially set on the basis of the result of the fiber diameter control is erroneously low, fiber diameter fluctuations due to the disturbances occur. Therefore, it is difficult to perform the control highly precisely and to make the fiber diameter uniform. An optical fiber drawing apparatus to be described hereunder eliminates the above-mentioned problem, and enables one to reliably produce optical fibers of uniform diameters controlled at higher precision.

EMBODIMENT 5

Figure 28:
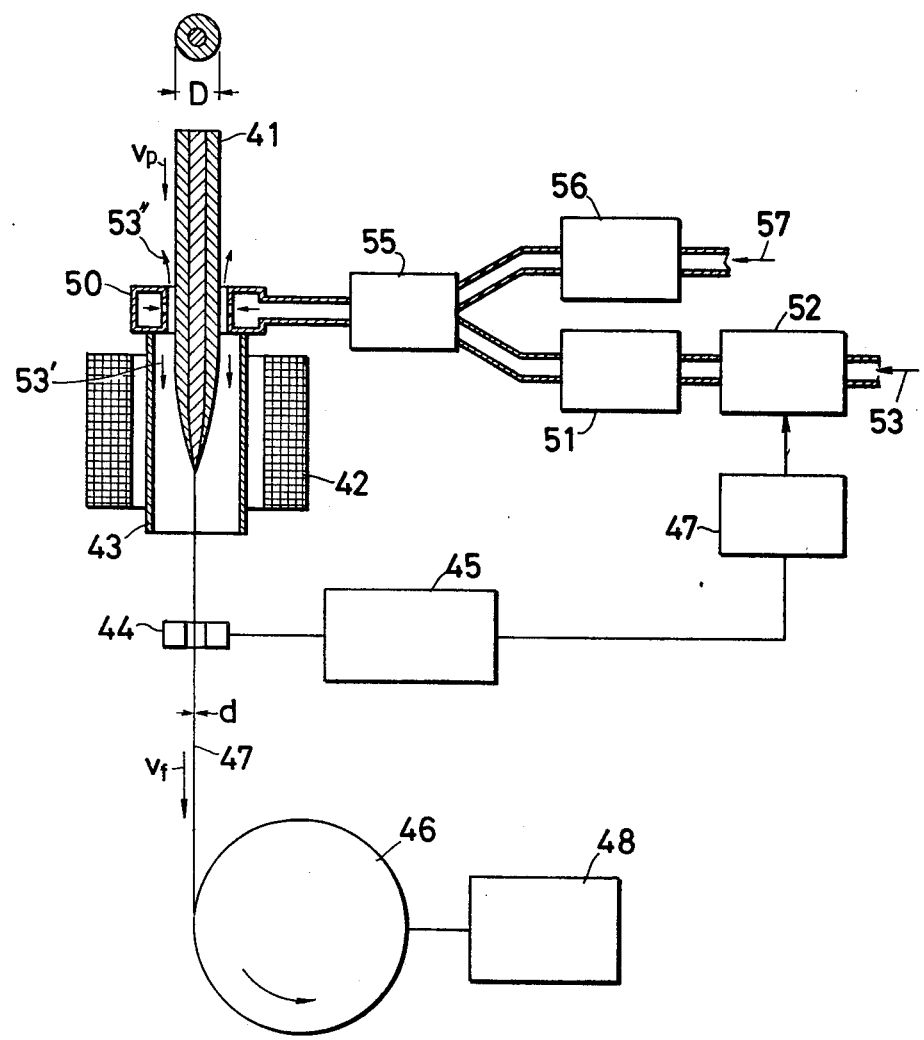
FIGS. 28 and 29 are explanatory views each showing the construction of an embodiment of the optical fiber drawing apparatus according to the invention.

As is illustrated in FIG. 28, during drawing, a fixed flow rate of gas (preferably, exceeding about 500 l/hr) is fed from a position 57 through a flow meter 56 as well as a gas mixer 55 into a gas curtain device 50 so as to prevent the fusion temperature from fluctuating on account of the imperfection of the structure of the preform and the external disturbances. Simultaneously therewith, a controlling gas flow rate (to be determined from FIG. 24) sufficient to control the diameter fluctuations of the optical fiber to arise on account of the outside diameter variations of the preform is fed from a position 53 through a valve opening-and-shutting unit for controlling the gas flow rate 52, a flow meter 51 and the gas mixer 55 into the gas curtain device 50. A signal detected by a detector 44 is fed back to the gas flow rate controlling valve opening-and-shutting unit 52 through a fiber diameter measuring instrument 45 as well as a control circuit 47, to change the flow rate of the gas passing through the flow meter 51. Thus, fiber diameter control is carried out. In this manner, the method of the invention divides in parallel the gas to be fed into the gas curtain device 50 and makes the gas flow rate through the respective divided parts as minute as possible. As a result, the controlling gas flow rate is controlled with higher precision, and an optical fiber of uniform diameter can be produced. In that sense, the invention is not restricted to the embodiment in FIG. 28. By way of example, the number of the gas inflow portions into the gas mixer 55 need not be two, but may be three or more. According to the invention, the fiber diameter fluctuations due to the disturbances can be suppressed substantially perfectly by the flow rate of the gas fed from the position 57, and hence, the object of the fiber diameter control can be limited only to the fiber diameter fluctuations ascribable to the outside diameter variations of the preform. Therefore, the flow rate varying range of the gas flow rate controlling valve opening-and-shutting unit 52 may be narrower than in the case of FIG. 18, and the control of the gas flow rate at higher precision is facilitated.

EMBODIMENT 6

Figure 29:
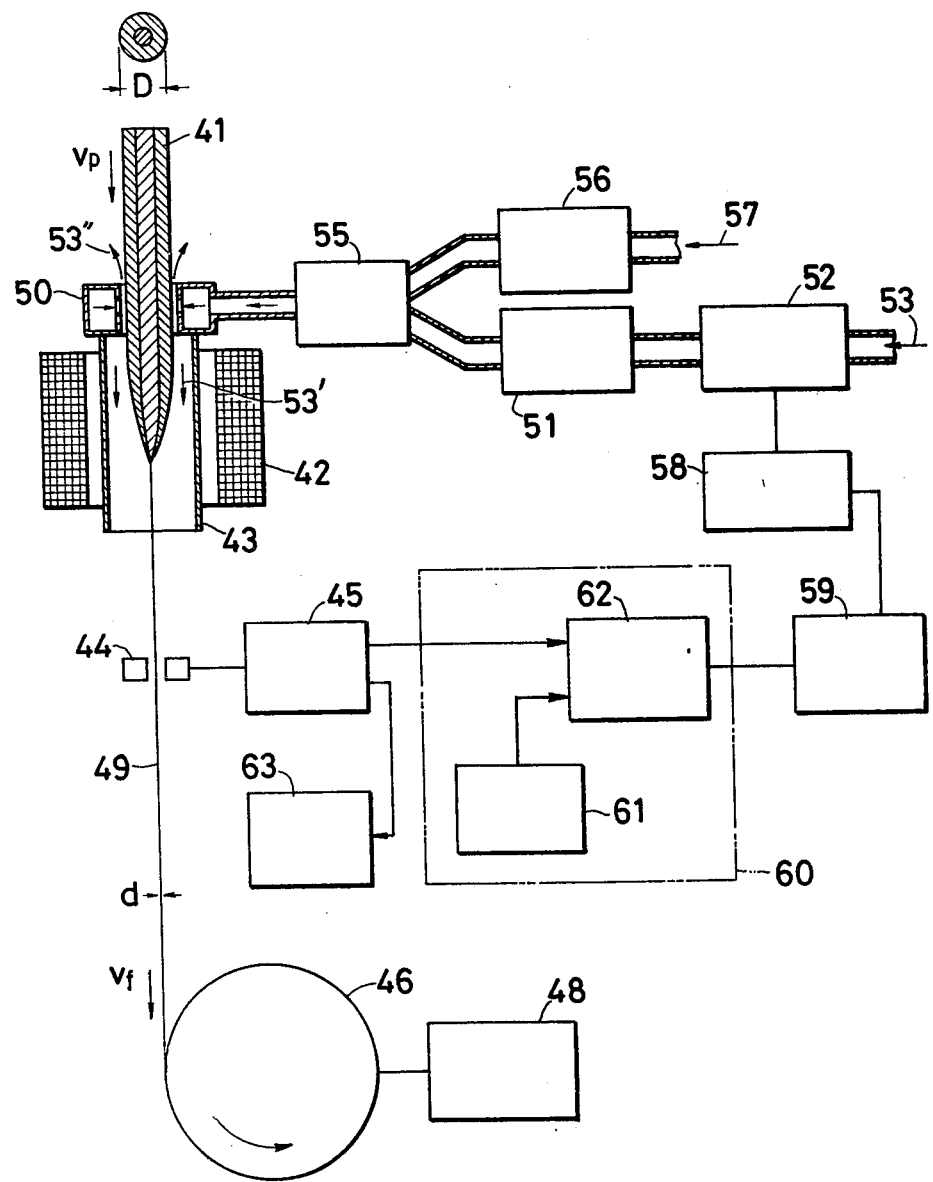

FIG. 29 is a schematic view of another embodiment of the optical fiber diameter control device according to the invention. Referring to the figure, numeral 58 designates a reduction gear, which is combined with a valve opening-and-shutting unit for controlling the flow rate of a gas. Numeral 59 indicates a d.c. motor, and the reduction gear 58 is connected with a shaft of the motor. Shown at 60 is a control circuit, which includes a reference voltage generating circuit 61 and a comparator circuit 62. The comparator circuit 62 compares a reference voltage from the circuit 61 and an analog output from a fiber diameter measuring instrument 45. When an error signal is produced as the result of the comparison, it is amplified so as to drive the d.c. motor. Numeral 63 denotes a recorder.

Figure 30:
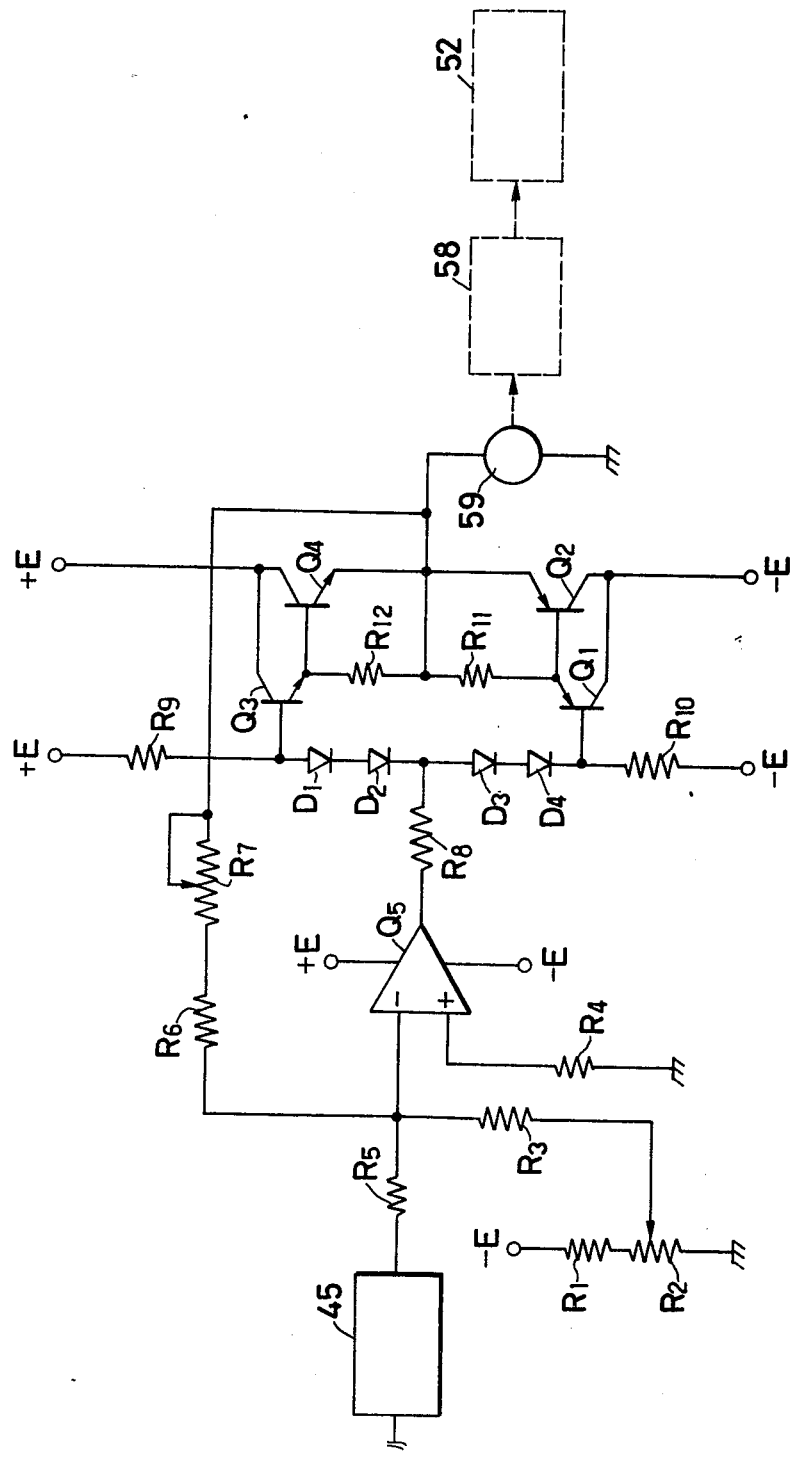
FIG. 30 is a circuit diagram showing a control circuit employed in the embodiment of the apparatus according to the invention.

FIG. 30 shows an embodiment of the control circuit 60 in FIG. 29. This circuit can also be employed in the apparatus shown in FIGS. 18 and 20. A variable resistance $R_2$ serves to set the reference voltage, a variable resistance $R_7$ is for the loop gain control, and a circuit part including transistors $Q_1$ through $Q_4$ is a d.c. motor driving circuit.

Description will now be made of an optical fiber diameter fluctuation characteristic in the case where an optical fiber was drawn by the use of the fiber diameter control device of the invention as shown in FIG. 29. Oxygen gas at a fixed flow rate of 430 l/hr was fed from a position 57. Simultaneously, oxygen gas was fed from a position 53. The gas flow rate controlling valve opening-and-shutting unit was set so that the valve of the gas flow rate F to be initially set (the value at a flow meter 51) might become 500 l/hr. The d.c. motor 59 executed the normal and reverse rotations according to the fiber diameter fluctuations, to control the flow rate of the oxygen gas passing through the flow meter 51. As a result, diameter fluctuations of the optical fiber were ±15% or so. The outside diameter variations of an optical fiber preform 41 employed herein were in a range of ±1 to 2%. On the other hand, an optical fiber was drawn by the method of FIG. 18. The gas flow rate controlling valve opening-and-shutting unit 32 was set so that the value of the gas flow rate to be set at first (the value at the flow meter 31) might become 930 l/hr. The flow rate of the gas passing through the flow meter 31 was controlled according to the fiber diameter fluctuations. As a result, the fluctuations became ±19% or so. This is attributed to the fact that, since the valve opening-and-shutting unit 32 for controlling the gas flow rate had to control the gas flow rate where the gas was flowing in large quantities, precision of the flow rate control could not be made high. A further fiber diameter control was conducted. Oxygen gas was fed from the position 33 in FIG. 18. The gas flow rate controlling valve opening-and-shutting unit 32 was set so that the value of the gas flow rate F to be set at first (the value at the flow meter 31) might become 500 l/hr. As a result, the fiber diameter fluctuations were ±51% or so. The result is evidently inferior to the foregoing results. This can be interpreted to the fact that the fiber diameter fluctuations ascribable to the disturbances were included.

As set forth above, the apparatus of the present embodiment consists in dividing in parallel the gas which is fed into the heating source during the drawing. More specifically, the gas at the fixed flow rate for suppressing the fiber diameter fluctuations due to the distrubances and the gas for controlling the fiber diameter fluctuations due to the outside diameter variations of the preform are separately fed into the heating source. Thus, the control of the gas flow rate can be performed at higher precision, and the fiber diameter fluctuations due to the disturbances can be suppressed substantially perfectly, so that optical fibers having uniform diameters can be manufactured more stably.

While we have shown and described several embodiments in accordance with the present invention, it is understood that the same is not limited thereto but is susceptible of numerous changes and modifications as known to a person skilled in the art, and we therefore do not wish to be limited to the details shown and described herein, but intend to cover all such changes and modifications as are obvious to one of ordinary skill in the art.

We claim:

1. In an apparatus for drawing an optical fiber having a heater for heating an optical fiber preform and a pulling arrangement for drawing out an optical fiber from said preform, the forward end portion of which has been fused by said heater, the improvement comprising:
   first means for detecting the diameter of said optical fiber, and
   second means for controlling a predetermined amount of gas flow along the outer peripheral surface of the fused part of said preform in response to detected fluctuations of said optical fiber diameter.

2. The improvement according to claim 1, further comprising third means, coupled to said pulling arrangement, for controlling the rate at which said optical fiber is drawn out from said preform in accordance with the diameter of the optical fiber drawn out.

3. The improvement according to claim 2, wherein said second means comprises means for regulating said gas flow in accordance with the diameter of the optical fiber drawn out.

4. The improvement according to claim 1, wherein said second means comprises means for regulating said gas flow in accordance with the diameter of the optical fiber drawn out.

5. The improvement according to claim 1, wherein said second means comprises a ring-shaped pipe having a plurality of apertures distributed along the inner surface thereof, disposed so as to surround said preform with a curtain of gas supplied through said apertures, and a gas conduit coupled to said ring-shaped pipe so as to introduce said gas thereto.

6. The improvement according to claim 5, wherein said ring-shaped pipe is disposed so as to surround an unfused portion of said optical fiber preform.

7. The improvement according to claim 6, wherein said second means further comprises an additional apertured ring-shaped pipe and a conduit therefor, disposed so as to surround an outer peripheral surface portion of the drawn out optical fiber.

8. The improvement according to claim 1, wherein said second means comprises means for enveloping the outer peripheral surface of the fused part of said optical fiber preform with a first gas flowing at a fixed flow rate and a second gas the flow rate of which depends upon the diameter of the optical fiber, said first and second gases flowing along paths independent of each other.

9. The improvement according to claim 8, wherein said second means comprises a ring-shaped pipe having a plurality of apertures distributed along the inner surface thereof, disposed so as to surround said preform with a curtain of a gas mixture of said first and second gases, and having first and second conduits coupled to said pipe through a mixing conduit for supplying, respectively, said first and second gases thereto.

10. The improvement according to claim 1, wherein said gas comprises a gas selected from the group consisting of an inert gas, an oxidizing gas, and an oxidizing gas containing a reaction agent for forming a glass film.

11. The improvement according to claim 1, wherein said second gas means is disposed upstream of said heater and causes gas flow along the outer peripheral surface of said preform as it is drawn through said heater.

12. The improvement according to claim 1, wherein said second means is disposed upstream and downstream of said heater and causes gas flow along the outer peripheral surface of said preform as it is drawn through said heater by differentially supplying gas upstream and downstream of said heater.

13. The improvement according to claim 11, wherein said second means comprises means for regulating said gas flow in accordance with the diameter of the optical fiber drawn out.

14. The improvement according to claim 12, wherein said second means comprises means for regulating said gas flow in accordance with the diameter of the optical fiber drawn out.

15. The improvement according to claim 9, wherein said second means is disposed upstream of said heater and causes gas flow along the outer peripheral surface of said preform as it is drawn through said heater.

16. The improvement according to claim 15, wherein second means further comprises a control valve, coupled with said second conduit, for controlling the flow of said second gas therethrough in accordance with the diameter of said optical fiber.

17. The improvement according to claim 16, wherein said first means further comprises an optical fiber diameter detector, a comparator circuit, coupled to said optical fiber diameter detector, for comparing the output thereof with a reference value, and a d.c. motor and a reduction gear arrangement connected in series between the output of said comparator circuit and said control valve.

18. In a process for drawing an optical fiber from an optical fiber preform, wherein the preform is heated and an optical fiber is drawn out from said preform, the forward-end portion of which having been fused by supplying heat to said preform, the improvement comprising the steps of detecting the diameter of said optical fiber, and preventing variations in the diameter of the optical fiber drawn from said preform due to changes in gas flow along the outer peripheral surface of said preform by controlling a predetermined amount of gas flow along the outer peripheral surface of the fused part of said preform in response to detected fluctuations of said optical fiber diameter.

19. The improvement according to claim 18, comprising the step of enveloping the fused part of said preform with a curtain of gas and controlling the rate at which said gas flows along the outer peripheral surface of the fused part of said preform in accordance with the diameter of the optical fiber drawn therefrom.

20. The improvement according to claim 1, wherein said second means controls said gas flow to an amount which suppresses any air current flowing along said fused part of said preform.

21. The improvement according to claim 1, wherein said second means controls said gas flow to within the range from 0.5 l/min to 350 l/min.

22. The improvement according to claim 1, wherein said second means maintains said gas flow at no more than 20 l/min.

23. The improvement according to claim 1, wherein said second means controls said gas flow at a flow rate from 1 to 20 l/min.

24. The improvement according to claim 23, wherein said flow rate is controlled in the range from 3 to 20 l/min.

25. The improvement according to claim 3, wherein said regulating means increases said gas flow when the diameter of said optical fiber increases, and decreases said gas flow when the diameter of said optical fiber decreases.

26. The improvement according to claim 4, wherein said regulating means increases said gas flow when the diameter of said optical fiber increases, and decreases said gas flow when the diameter of said optical fiber decreases.

27. The improvement according to claim 18, wherein said gas flow is controlled at a rate which suppresses any air current flowing along said fused part of said preform.

28. The improvement according to claim 18, wherein said gas flow is controlled at a rate in the range from 0.5 l/min to 350 l/min.

29. The improvement according to claim 18, wherein said gas flow is controlled at a rate in the range from 1 l/min to 20 l/min.

30. The improvement according to claim 29, wherein the gas flow rate is in the range from 3 l/min to 20 l/min.

* * * * *